US007866546B1

(12) United States Patent
Vance

(10) Patent No.: US 7,866,546 B1
(45) Date of Patent: Jan. 11, 2011

(54) AUTOMATED CHECKOUT UNIT AND METHOD OF USE THEREOF

(75) Inventor: James R. Vance, Alvaton, KY (US)

(73) Assignee: Pan-Oston

( * ) Notice: Subject to any disclaimer, the term of this patent is extended or adjusted under 35 U.S.C. 154(b) by 935 days.

(21) Appl. No.: 11/788,345

(22) Filed: Apr. 19, 2007

Related U.S. Application Data

(60) Provisional application No. 60/793,809, filed on Apr. 21, 2006, provisional application No. 60/831,383, filed on Jul. 17, 2006.

(51) Int. Cl.
*G07D 11/00* (2006.01)
*G06K 15/00* (2006.01)

(52) U.S. Cl. ....................................... 235/379; 235/383

(58) Field of Classification Search ................. 235/380, 235/379, 382, 383, 375
See application file for complete search history.

(56) References Cited

U.S. PATENT DOCUMENTS

| | | | | |
|---|---|---|---|---|
| 5,557,088 | A * | 9/1996 | Shimizu et al. | 235/383 |
| 6,032,128 | A | 2/2000 | Morrison | |
| 6,145,629 | A | 11/2000 | Addy | |
| 6,354,498 | B1 | 3/2002 | Lutz | |
| 6,386,448 | B1 * | 5/2002 | Addy | 235/383 |
| 6,401,074 | B1 * | 6/2002 | Sleeper | 705/14.65 |
| 6,497,362 | B2 | 12/2002 | Persky | |
| 6,522,772 | B1 | 2/2003 | Morrison | |
| 6,547,040 | B2 | 4/2003 | Goodwin | |
| 6,550,582 | B2 | 4/2003 | Addy | |
| 6,571,218 | B1 | 5/2003 | Sadler | |
| 6,588,549 | B2 | 7/2003 | Wike | |
| 6,598,791 | B2 | 7/2003 | Bellis | |
| 6,837,428 | B2 | 1/2005 | Lee | |
| 6,854,656 | B2 | 2/2005 | Matsumori | |
| 6,856,964 | B1 | 2/2005 | Sadler | |
| 6,990,463 | B2 | 1/2006 | Walter | |
| 6,991,066 | B2 | 1/2006 | Persky | |
| 7,000,833 | B2 | 2/2006 | Sato | |
| 7,016,862 | B1 | 3/2006 | Vassigh | |
| 7,034,679 | B2 | 4/2006 | Flynn | |
| 7,040,455 | B2 | 5/2006 | Bogat | |
| 7,048,184 | B2 | 5/2006 | Persky | |
| 7,066,389 | B2 | 6/2006 | Dickover | |
| 7,070,112 | B2 * | 7/2006 | Beenau et al. | 235/488 |
| 7,127,706 | B2 | 10/2006 | Mason | |
| 2002/0139617 | A1 | 10/2002 | Goodwin | |
| 2002/0186133 | A1 | 12/2002 | Loof | |
| 2003/0006098 | A1 * | 1/2003 | Wike et al. | 186/61 |
| 2003/0009384 | A1 | 1/2003 | Sadler | |

(Continued)

OTHER PUBLICATIONS

"NCR Fastlane C-Series", NCR Corporation, pp. 1-4, 2002.

*Primary Examiner*—Thien M Le
(74) *Attorney, Agent, or Firm*—H. Jay Spiegel

(57) ABSTRACT

The present invention is a checkout module for use in a retail checkout lane and methods of using the checkout module. The module needs only a power source and a network source. In another embodiment, the checkout module is designed to be used in a self-checkout mode or an assisted checkout mode and is further designed to be easily rotated to convert the checkout lane into a fully attended lane. The present invention may be used to quickly convert a conventional, attended checkout into an automated checkout, which may use one or more employees to assist with bagging the purchased items.

15 Claims, 41 Drawing Sheets

U.S. PATENT DOCUMENTS

2003/0018522 A1 1/2003 Denimarck
2003/0018897 A1 1/2003 Bellis
2003/0024982 A1 2/2003 Bellis
2003/0047387 A1 3/2003 Bogat
2003/0075602 A1 4/2003 Wike
2003/0078849 A1 4/2003 Snyder
2003/0115103 A1 6/2003 Mason
2003/0120547 A1 6/2003 Walter
2003/0121974 A1 7/2003 Blanford
2003/0122667 A1 7/2003 Flynn
2003/0149630 A1 8/2003 Jacobs
2003/0217892 A1 11/2003 Persky
2003/0226891 A1 12/2003 Sato
2003/0234288 A1 12/2003 Canipe
2004/0041021 A1 3/2004 Nugent
2004/0069848 A1* 4/2004 Persky ........................ 235/383
2004/0220860 A1 11/2004 Persky
2004/0222302 A1 11/2004 Matsumori
2005/0006176 A1 1/2005 Kurtz
2005/0075908 A1 4/2005 Stevens
2005/0154646 A1 7/2005 Chermesino
2005/0171841 A1 8/2005 Prorock
2005/0187826 A1 8/2005 Wike
2005/0205735 A1* 9/2005 Ichikawa et al. ....... 248/292.12
2005/0283402 A1 12/2005 Mason
2006/0038007 A1 2/2006 Dickover
2006/0043193 A1 3/2006 Brock
2006/0080177 A1 4/2006 Walter
2006/0131402 A1 6/2006 Crockett
2008/0061139 A1* 3/2008 Roquemore ................. 235/383
2008/0121702 A1* 5/2008 Fortenberry ................ 235/383

* cited by examiner

| | | |
|---|---|---|
| FIG. 20A | FIG. 20B | FIG. 20C |
| FIG. 20D | FIG. 20E | FIG. 20F |

FIG. 20

AUTOMATED CHECKOUT UNIT AND METHOD OF USE THEREOF

This application claims the benefit of U.S. Provisional Patent Application Ser. No. 60/793,809, filed Apr. 21, 2006, entitled "Automated checkout attendant and method of use thereof," which is hereby incorporated by reference in its entirety, and U.S. Provisional Patent Application Ser. No. 60/831,383, filed Jul. 17, 2006, entitled "Automated checkout unit and method of use thereof," which is hereby incorporated by reference in its entirety.

Be it known that I, James R. Vance, a United States citizen, residing at 355 Stone Bluff Lane, Alvaton, KY 42122, have invented a new and useful "Automated checkout unit and method of use thereof."

STATEMENT REGARDING FEDERALLY SPONSORED RESEARCH OR DEVELOPMENT

Not applicable

REFERENCE TO A "MICROFICHE APPENDIX"

Not applicable

FIELD OF THE INVENTION

The present invention relates to self scan checkout modules and methods of installation and use thereof.

BACKGROUND OF THE INVENTION

As retailers have been working to reduce their transaction costs, self checkout lanes have become increasingly common in grocery and retail stores. U.S. Published Patent Applications 2005/0187826, published Aug. 25, 2005, by Wike et al.; 2005/0006176, published Jan. 13, 2005, by Kurtz et al.; 2004/0220860 published Nov. 4, 2004, by Persky et al.; 2004/0069848 published Apr. 15, 2004, by Persky; 2004/0041021 published Mar. 4, 2004, by Nugent, Jr.; 2003/0115103 published Jun. 19, 2003, by Mason; and U.S. Pat. Nos. 6,856,964, issued Feb. 15, 2005 to Sadler; 6,837,428 issued Jan. 4, 2005 to Lee et al., the details of which are incorporated herein by reference, are proposed as attempts to solve retail related problems. The transition to more self checkout lanes has, however, been largely constrained to stores owned by the larger chains and stores that generate high volume of business. This has occurred for at least two reasons. First, current technology requires a significant capital investment to add the conventional self checkout lanes to a retail store as well as a significant delay in generating a return on the investment. The store must first remove one or more conventional, attended checkout lanes. This demolition must occur even though the front end of the lane where the customer places items to be purchased, the scanner/scale, EFT, and the back end of the lane—the bagging area—are perfectly serviceable. These conventional lanes are then replaced with new self checkout lanes each of which may include a new front end, a new scanner/scale, EFT, and a new bagging area that unnecessarily increase the installation cost to the retailer. The retailer further faces the additional cost of running new electrical and data connections to the new checkout lanes because it is unlikely that the current power and data connections will be properly located for the new lanes.

Second, self checkout lanes often do not make sense for smaller retailers despite their need to reduce their transaction cost to compete with the larger retailers. The reason for this is that generally a greater percentage of a retail floor's space must be dedicated to self checkout lanes to allow the processing of the same number of customers in the same amount of time and space as with conventional, attended checkout lanes. Also, the current configurations of self checkout require service access of 24" on both the front and rear of the cabinets. This is required because self checkout lanes typically require the customer to unload the items, scan the items, process the payment, and bag the items. On the other hand, up to two people share these tasks in an attended checkout when a second store employee is employed in the bagging area to bag the purchased items. The current state of technology makes it impractical for a store employee to assist with the checkout process in a traditional self checkout lane due to security constraints. In addition, transaction quantity is generally limited due to bagging constraints.

Accordingly, it would be advantageous to provide a mobile or permanent module that could be used to convert an existing, conventional, attended checkout lane to a self checkout lane without major capital costs beyond the cost of the module. It would be further advantageous if the module could be used in a manner to allow store employees to assist customers with the checkout process or improve checkout productivity during peak periods.

An additional issue faced by all retailers is the potential of theft of cash by store employees operating cash registers or customers reaching into the cash drawer. Another form of loss is "Sweet Hearting," which is where the cashier knowingly passing a product around the scanner. It would be an advantage if a checkout lane could be operated with the assistance of an employee to increase the number of purchases that can be processed in a given period while at the same time eliminating the need for the employee to handle any money. This would eliminate, or at a minimum, greatly reduce the potential for theft by a store employee. The employee would help with scanning the items, but weight verification would still be enabled making "Sweet Hearting" a lot harder. Furthermore when it came time to pay the customer would insert their money into the payment slots, eliminating the possibility for employees to steal money from the cash draw.

SUMMARY OF THE INVENTION

The present invention is directed to a checkout module and methods of using the checkout module that solve the above mentioned problems. The checkout module provides the retailer with the flexibility to utilize a single checkout lane in a variety of ways to meet the needs of its business based on the level of activity in the store at any given time. For example, during non-peak periods, a checkout lane using the checkout module can be configured as a self-checkout lane with the customer being responsible for scanning and bagging the items purchased.

As the level of activity within the store increases, the retailer can deploy employees to assist customers in checking out and bagging their items. In this mode, the store employee would be deployed in the bagging area to bag the items. To increase the speed of checkout in this mode, the security features associated with a self-checkout lane, such as weight verification, can be defeated, or the tolerances increased, to reduce the number of errors flagged by the system. This is done at little risk to the retailer because the employee that is bagging the items can use the checkout module's mobile attendant, a hand held wireless monitoring device.

If necessary, during peak periods the retailer can easily rotate and slide the checkout module into the attended checkout position and use the checkout lane as a fully attended checkout with an employee positioned as a traditional cashier. Where the checkout lane was originally configured as an attended checkout, this may require nothing more than rotating the checkout module as further described and shown herein. When the checkout module is incorporated into a newly constructed checkout lane, after rotating the checkout module from the self checkout position to the attended checkout position, then a traditional, attended checkout lane is operational.

In order to avoid the tremendous capital cost associated with installing a new self checkout system, in certain embodiments, the checkout module of the present invention is designed to occupy the same amount of space that is typically reserved for a cashier in typical attended checkout lane. Because the checkout module is sized to fit into this existing space, it can work with any type of front end and any type of bagging area, regardless of the size of these portions of the checkout lane or the type of front end (e.g. conveyor belt delivery or fixed counter), or bagging area (e.g. powered takeaway or carousel unit). It can also work with any existing scanner/scale unit that is capable of providing a digital output. The retailer therefore does not face the prospect of having to replace the front end of the lane, the scale/scanner portion of the lane, and the bagging area to reap the benefits of self checkout. Rather, all the retailer must do is have wiring of the existing lane modified so that the checkout module can be plugged into it, taking advantage of the retailer's existing, functional hardware.

The invention disclosed herein is a checkout module for use in a checkout lane in a retail store, wherein said checkout lane has a queuing area for customers waiting to checkout, a scanner that a customer uses to scan items being purchased, and a bagging area, including a cabinet, the cabinet having a first side, a second side, and a third side, a video display mounted on the first side of the cabinet, a plurality of casters located on the bottom of the cabinet, a hinge attached to the cabinet, a latch attached to the side of the cabinet opposite of the hinge, a payment accepting device attached to the cabinet, and a currency dispensing device attached to the cabinet. In certain embodiments, the video display includes a touch screen the customer can use to interact with the checkout module. Other embodiments further include a slide bracket attached to the hinge, a slide track attached to the slide bracket, and a checkout lane attached to the slide track. The payment accepting device may be an EFT terminal, a biometric identification reader, a paper currency acceptor, or a coin currency acceptor. Certain embodiments may further include a data connection cable, the connection cable having a first end connected to the checkout module and a second end terminating in a connector. The checkout lane includes a means for verifying each item that has been scanned. In other embodiments, the data connection cable further includes a cable to carry the output from said scanner, a cable to carry the output from a scale that is incorporated in said scanner, and a network cable to connect said checkout module to the retail store's inventory management software. Other embodiments include a latch point attached to the checkout lane. In certain embodiments, the cabinet is sized to fit into the space provided for a cashier in a conventional checkout lane.

The invention disclosed herein is a method of converting a conventional checkout lane that includes a scanner and a bagging area to a checkout lane that can be operated in a self-checkout mode or an employee assisted mode, including installing a receptacle on the checkout lane, the receptacle comprising an output from the scanner, installing one or more latch points on the checkout lane, operably connecting a checkout module including self-checkout and employee assisted checkout capabilities to said receptacle, and removably connecting the checkout module to the checkout lane by latching the checkout module to the latch points, so that the checkout module rotates relative to the checkout lane.

Another embodiment of the invention is a method of converting a checkout lane from a conventional attended configuration to a self checkout configuration, comprising moving a checkout module from a first position to a second position, wherein the checkout module is both rotated and moved along a linear path. In certain embodiments, the rotation of the checkout module is about 90 degrees.

Also disclosed is an embodiment of the invention that is a checkout module for use in a checkout lane in a retail store, wherein said checkout lane has a queuing area for customers waiting to checkout, a scanner that a customer uses to scan items being purchased, and a bagging area, including a cabinet, the cabinet having a first side oriented toward said customer's location when the customer is scanning items to be purchased, a second side oriented toward the queuing area, and a third side oriented toward the bagging area, a plurality of casters located on the bottom of the cabinet, a hinge attached to the cabinet so that the cabinet may be rotatably and slidably attached to the checkout lane, a video display mounted on the first side of the cabinet, the video display having a touch screen the customer can use to interact with the checkout module, a payment accepting device attached to the cabinet, a currency dispensing device attached to the cabinet, a handheld mobile terminal operably connected to the scanner, and a remote security database, the database being accessed through VPN technology by the handheld mobile terminal. In certain embodiments, the payment accepting device may be an EFT terminal, a biometric identification reader, a paper currency acceptor, or a coin currency acceptor. Other embodiments further include a data connection cable, the connection cable having a first end connected to the checkout module and a second end terminating in a connector.

Also disclosed is a method for checking out a customer in a retail store with the assistance of a store employee using a checkout lane that includes a checkout module, including the customer initiating a transaction by interacting with the checkout module through a touch screen video display, the customer using the scanner to scan one or more items, the store employee using a handheld mobile terminal to scan one or more items from a location that is anywhere in the store, and the store employee monitoring the transaction. Certain embodiments of the invention further include the customer tendering payment via a payment accepting device, or the customer tendering electronic payment via a payment accepting device. Other embodiments of the invention provide a method of communicating transaction information, including providing a computer, providing a first server, wherein the first server is a MMS server, providing a second server, wherein the second server is a POS server, communicating information in real time from the computer to the first server, communicating information in real time from the first server to the second server, communicating information in real time from the second server to the first server, and communicating information in real time from the first server to the computer.

BRIEF DESCRIPTION OF THE DRAWINGS

The accompanying drawings, which are incorporated in and constitute a part of this specification, illustrate embodiments of the invention and, together with a general description of the invention given above and the detailed description of the preferred embodiments given below, serve to explain the principles of the invention. It should however be understood that there is no intent to limit the invention to the particular forms disclosed, and that this patent application incorporates by reference all references and publications disclosed herein. Rather the intent is that the invention be limited only by the scope of the claims.

DETAILED DESCRIPTION OF THE INVENTION

The invention disclosed herein is a checkout module for checkout in a retail store, an embodiment of the invention including a cabinet, a video display, a hinge so that the module rotates and slides relative to a checkout lane, a latch for holding the module in one of two fixed positions, a payment accepting device, and a currency dispensing device. In certain embodiments, the checkout module also includes a remote security database which is accessed through VPN technology. Also, disclosed herein is a method of converting a conventional checkout lane to a self scan checkout lane. That method includes installing a receptacle, installing latch points, providing a checkout module, operably connecting the checkout module to the receptacle, and removably connecting the checkout module to the checkout lane. Finally, disclosed herein is a method of checking out a customer, including the customer touching a display screen, scanning items, a store employee using a handheld mobile terminal to scan an item for purchase from anywhere in the store, and a store employee monitoring the transaction. In an alternate embodiment, the method of checking out a customer includes the additional step of monitoring the transaction by a hand held mobile terminal.

Preferred embodiments of the present invention will first be described. Preferred methods for using the present invention will then be described.

I. Checkout Module

Figure 9:
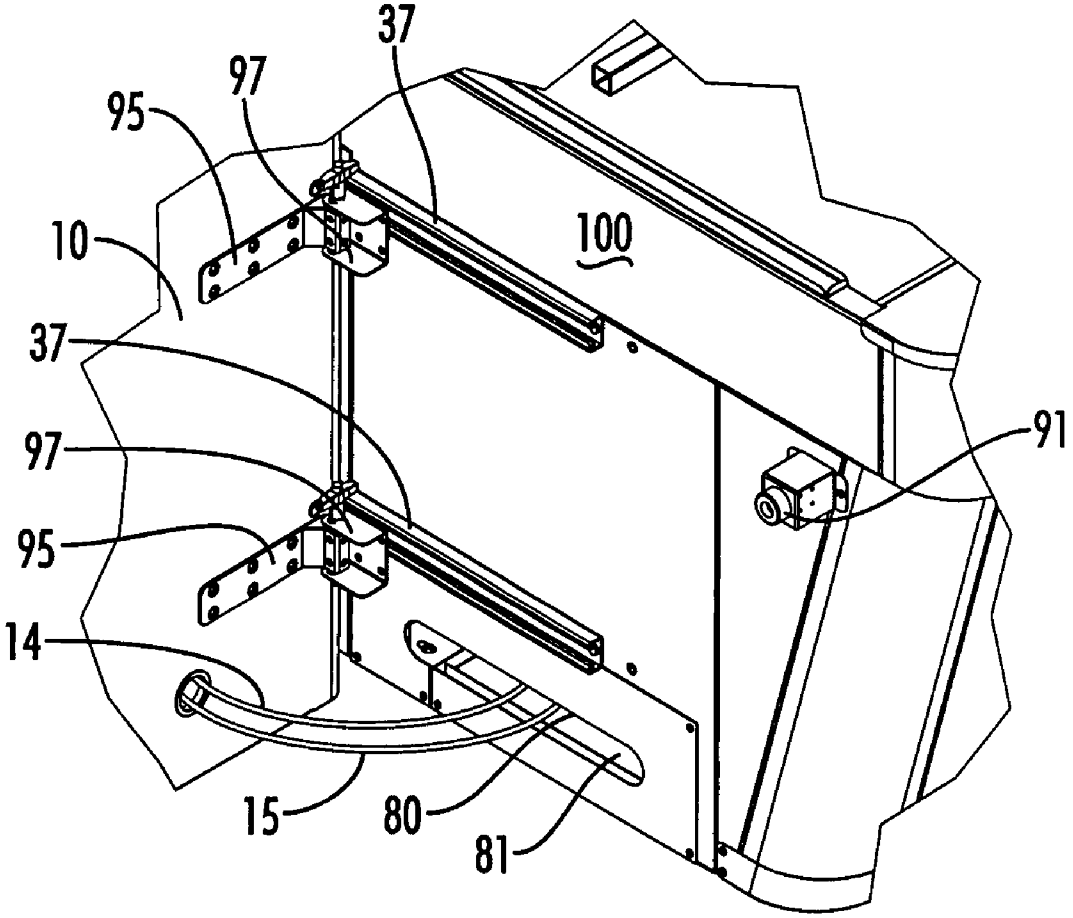
FIG. 9 is a close up of a portion of FIG. 7 to show a perspective view of an embodiment of the checkout module having hinges, slide brackets, slide tracks, and latch so that the checkout module rotates and slides relative to the checkout lane and may be latched into one of two fixed positions. Also shown is the receptacle which receives the data cable and power cable from the checkout module, so that components of the checkout module may communicate with components of the checkout lane. In certain embodiments, these components may also communicate in a wireless capacity, as further described herein.
Figure 13:
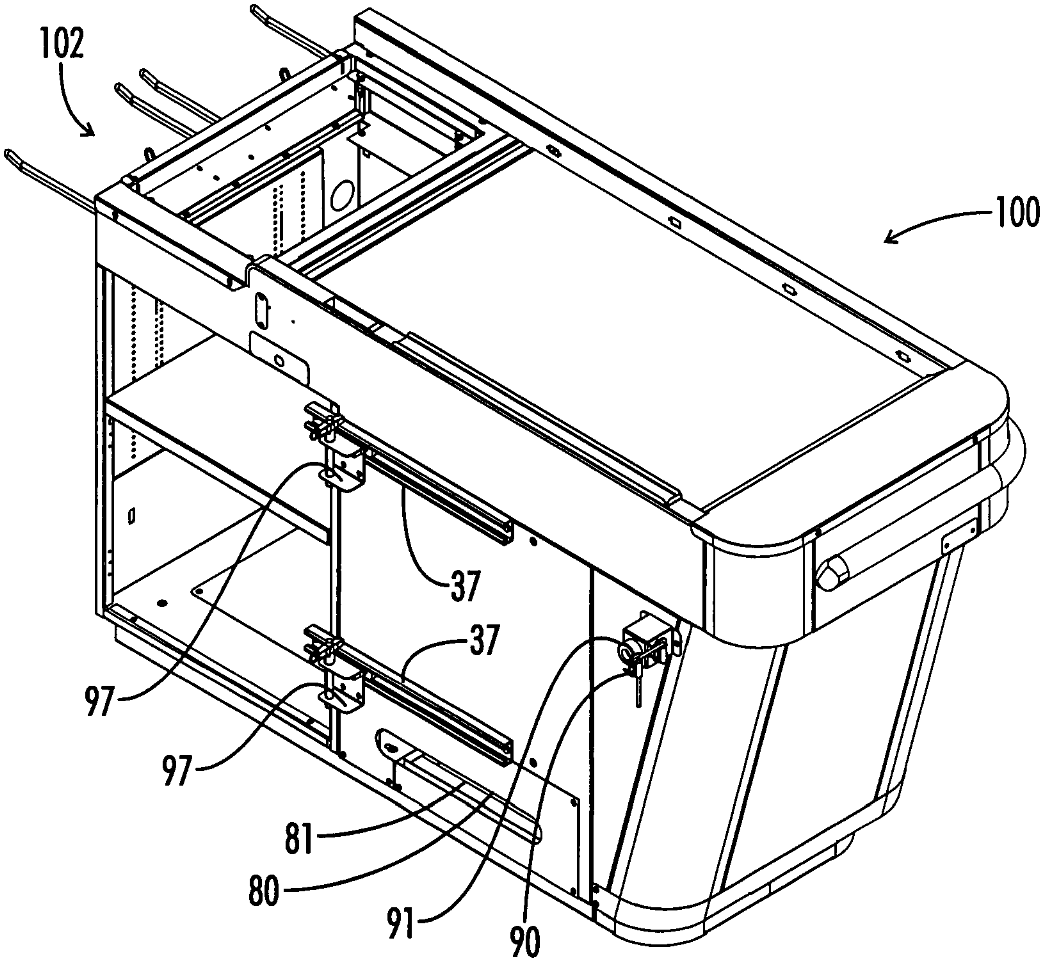
FIG. 13 is a perspective view of a checkout lane without the checkout module installed showing the slide bracket, slide track, latch point, and receptacle for the data and power cables from the checkout module.

FIGS. 1-4 show a first embodiment of checkout module 10. Checkout module 10 is sized to allow it to fit in the area reserved for a human operator in a conventional, attended checkout lane. Referring again to FIGS. 1-4, checkout module 10 includes a cabinet 2, also called housing, that houses the various other components and provides a point of attachment for those other components as further described herein. Exemplary material of construction for the cabinet 2 includes metal and other materials commonly known in the industry for the functions shown and described herein. The cabinet 2 is supported by four casters 12 that allow checkout module 10 to be moved into location. In other embodiments, the cabinet 2 may be supported by a plurality of casters 12, or equivalents which allow the repeated movement of the checkout module 10 between the positions, as further described herein. Checkout module 10 also includes cables 14 and 15, shown in FIG. 3. Cable 14 provides a single data connection through which checkout module 10 is connected to the scanner/scale portion of the checkout lane 100, the security devices integrated into the checkout lane 100, such as a scale for weight verification, and the store's existing software that is used to manage the current cashier stands. Of course, as would be obvious to one of ordinary skill in the art, the data connection could be separated into two or more separate cables. Cable 15 is a standard electrical cable for supplying power to checkout module 10 from a standard receptacle 81, such receptacle 81, is best seen in FIGS. 9 and 13. In certain embodiments, checkout module 10 further includes at least one latch 16 that allows the checkout module 10 to be connected detachably to the checkout lane 100. One example of this type of latch is an assembly using a Detent Pin, which is widely commercially available. In other embodiments, the number of latches 16 may be two or more.

Also shown in FIGS. 1-4 are the lane light 21, stack light 22, signal tower 23, front access door 25, level adjuster 27, safety bumper 31, monitor mounting plate 43, and handles 33 for moving the checkout module 10 into a desired position. The cabinet 2 has a first side 5, second side 6, and third side 7.

Figure 5:
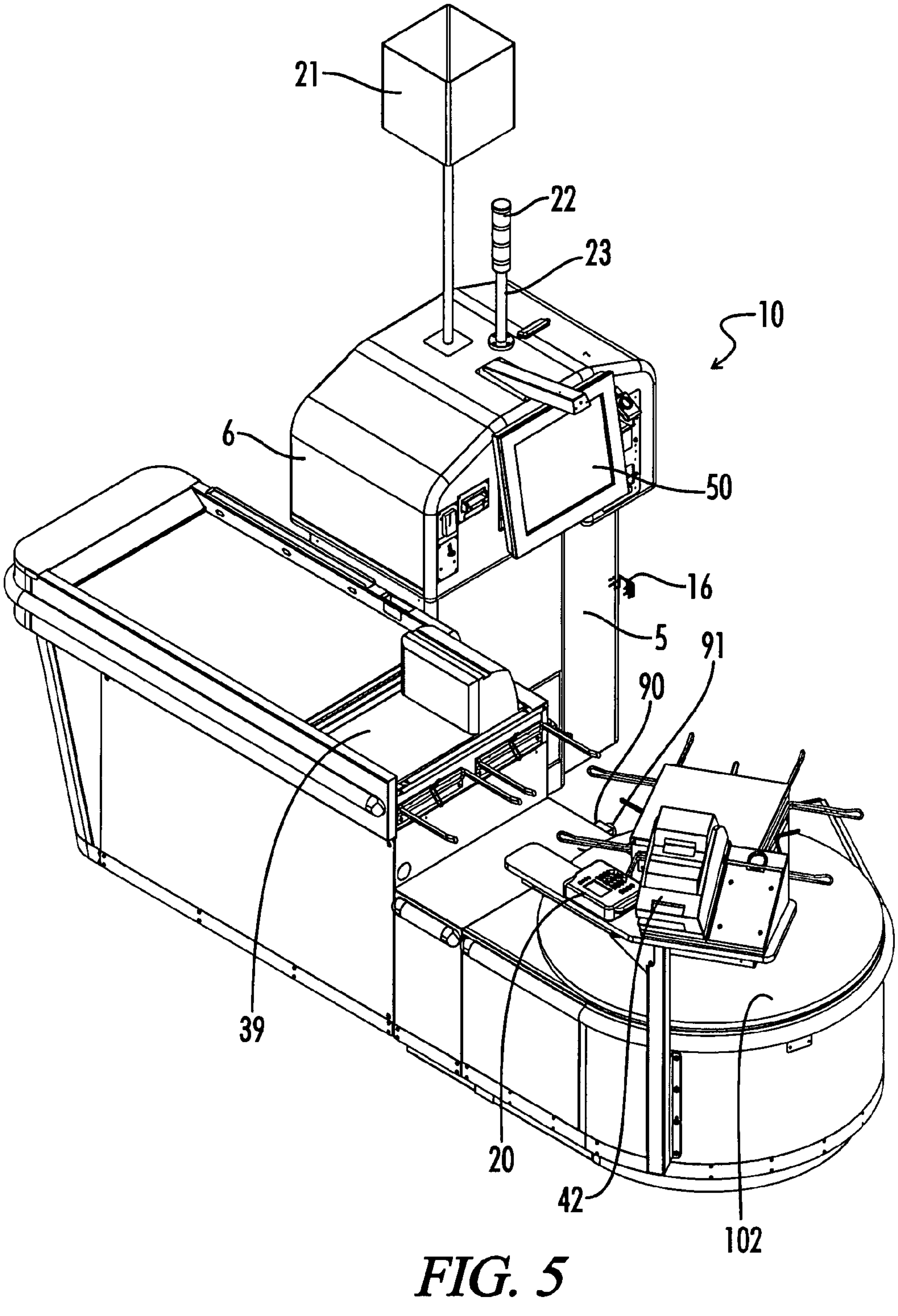
FIG. 5 is a perspective view of an embodiment of the checkout module installed in a checkout lane having a carousel rear. The checkout module is rotated and slid into the assisted checkout position such that a human clerk may assist a customer in the conventional manner. In alternate embodiments, the rear may be a takeaway rear unit.
Figure 6:
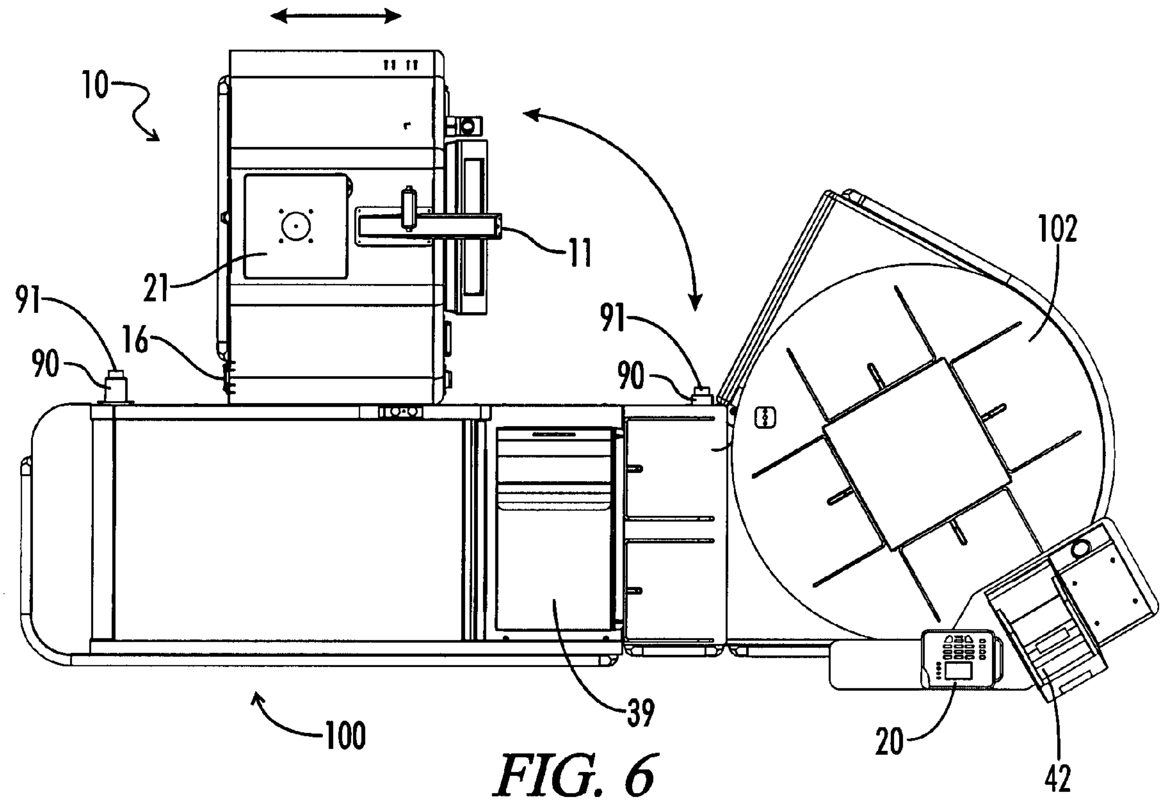
FIG. 6 is a top view of a checkout lane showing the rotating action and sliding action of the checkout module. The arrows indicate the directions of movement. When the screen is facing the scanner, the checkout module is positioned for self-checkout. When the screen is perpendicular to the scanner (as shown), the checkout module is positioned for assisted checkout with use of a human clerk.
Figure 7:
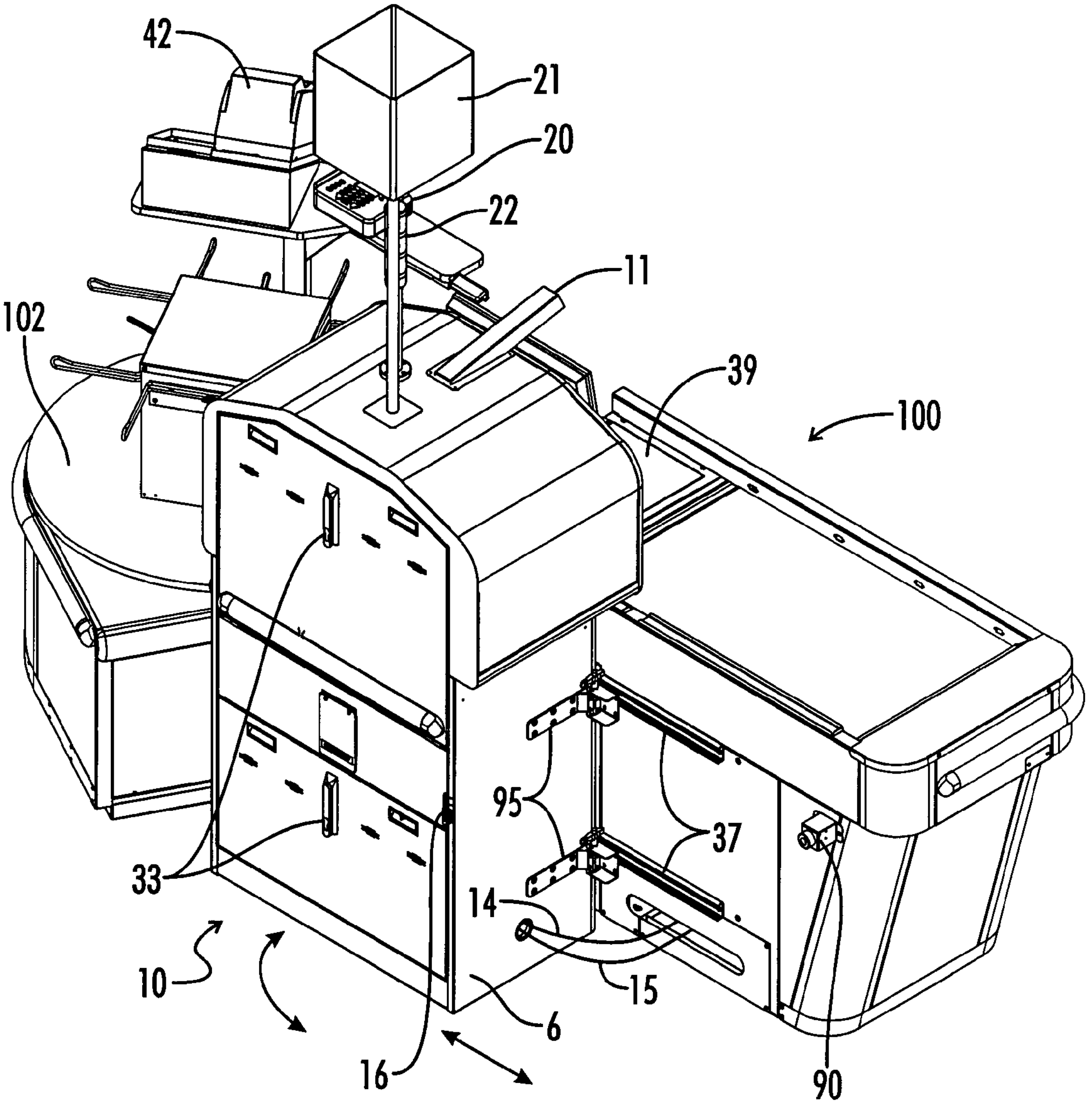
FIG. 7 is a rear perspective view of an embodiment of the checkout module installed in a checkout lane in which the checkout module is rotated into the self-checkout position such that a consumer facing the screen may use the module. Again, the arrows indicate the directions of movement.
Figure 8:
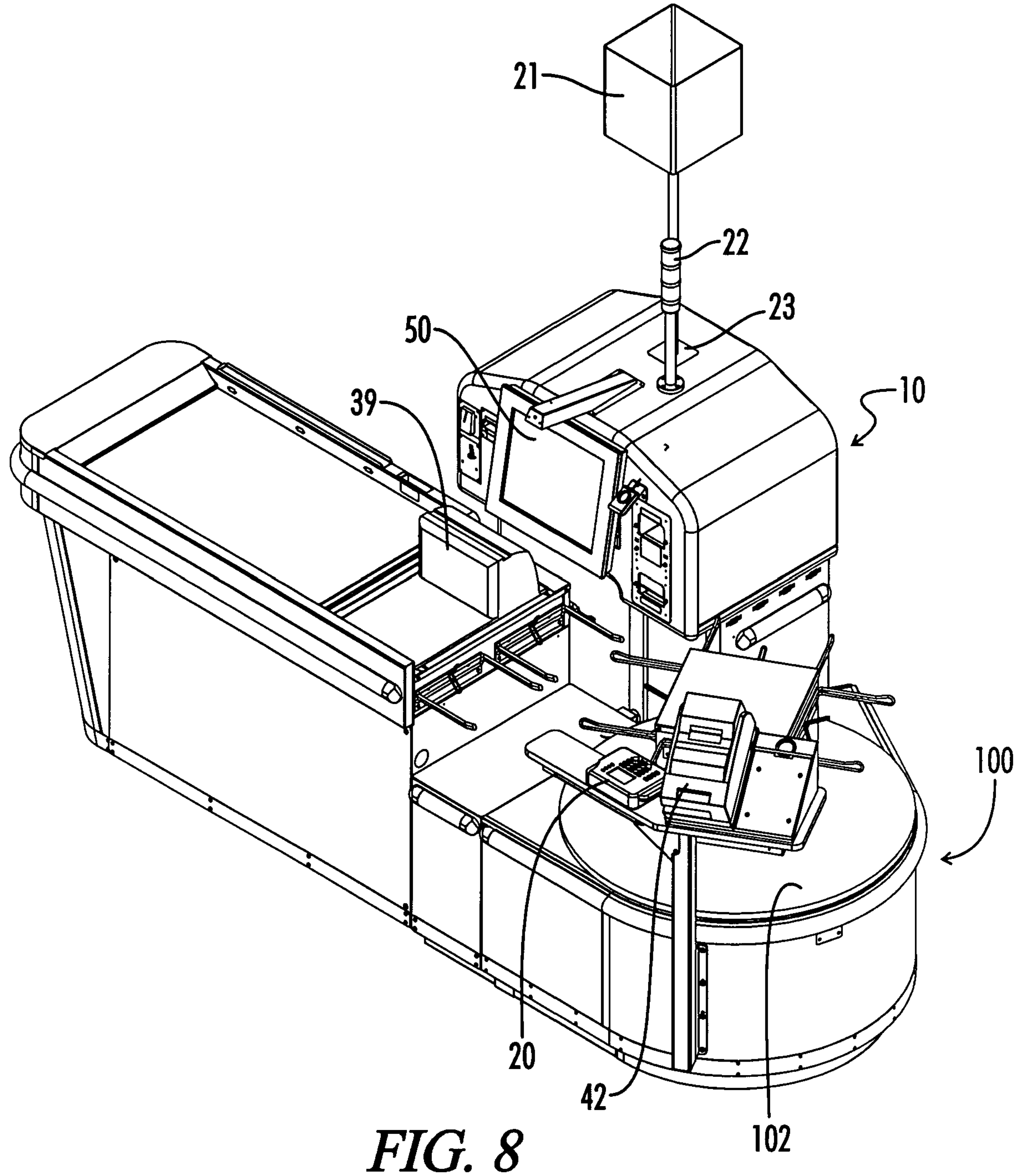
FIG. 8 is a front perspective view of an embodiment of the checkout module installed in a checkout lane in which the checkout module is rotated into the self-checkout position such that a consumer facing the screen may use the module.

Referring now to FIGS. 5 and 6, there is shown an embodiment of the checkout module 10 positioned with a checkout lane 100. The checkout module 10 rotates upon a standard hinge 95 and slides along a track 37 between two positions. The first position is shown in FIGS. 5 and 6. This is the position in which an employee would use the checkout module 10 as a conventional checkout. In this position, the screen 50, also called a video display, is perpendicular to the checkout lane 100, so that an attendant may view the screen 50 and pass items along the checkout lane 100. Stated another way, the first side 5 of the cabinet 2 is facing the rear, or bagging area. The second side 6 of the cabinet 2 is facing the queuing area, and the third side 7 of the cabinet 2 is facing opposite of the second side 6. An employee of the store may then scan products for consumers and perform a traditional checkout by use of the checkout module 10. The checkout module 10 is quickly and easily rotated upon the hinges 95 and slide along the tracks 37 by a person, for example, in order to be placed in a second position. The second position is the self-check orientation, as shown in FIGS. 7 and 8. Transitioning from the first position to the second position is shown by the arrows in FIGS. 6 and 7. While in the first position, the checkout module 10 is unlatched from the checkout lane 100. The checkout module 10 then slides along the slide track 37 and rotates upon the hinge 95 so that the screen 50 of the checkout module 10 faces the checkout lane 100 and the elements located on the checkout module 10 are reachable by a consumer that is checking themselves. At that point, the checkout module 10 is latched into the fixed second position. In certain embodiments, latching into a fixed position is referring to the interconnection of a latch 16 and latch point 90, for example, in order to hold the checkout module 10 in a fixed position so that it may be used as described herein. In certain embodiments, the exact position of the latches 16 and latch points 90 may be moved to suit the specific needs in a given embodiment. In other embodiments, the latch 16 and latch points 90 may be fasteners known in the art for removably connecting the checkout module 10 to the checkout lane 100. In certain embodiments, transitioning the checkout module 10 from the second position to the first position may be accomplished by inverting the steps above. Examples of latch points 90 to which latches 16 may connect are shown in FIG. 13. In certain embodiments, the checkout module 10 may not be latched. In alternate embodiments, the checkout modules 10 may be the mirror image of those embodiments shown herein. For example, a mirror image version may be desired due to the location at which it will be used. The exact content of the checkout lane 100 is dependent upon the desires of the store. Accordingly, a bagging portion 102, such as carousels, take aways, or the like may be used.

Figure 10:
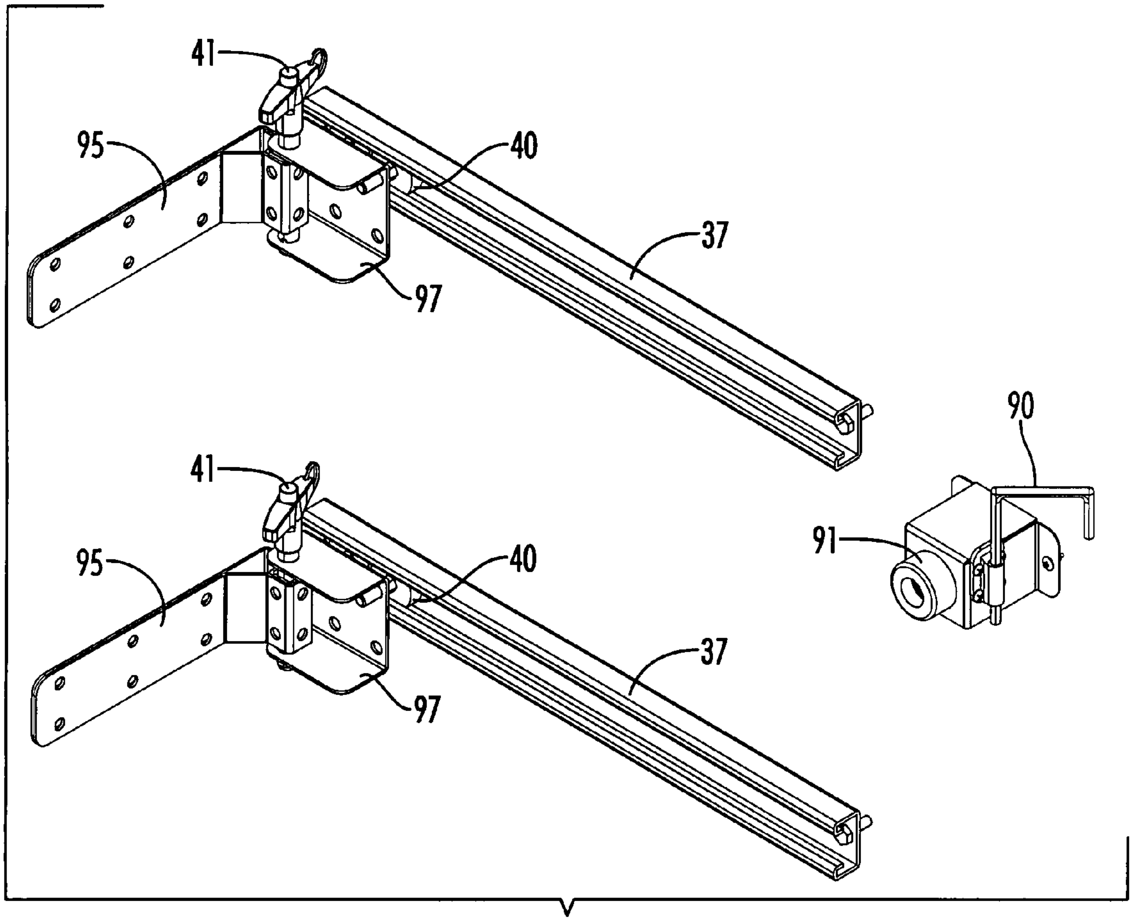
FIG. 10 is a perspective view of an embodiment of the hinge, slide, and latch mechanism. Shown are the hinge, slide bracket, rollers, slide track, bumper stop, and latch which allow the checkout module to rotate and slide relative to the checkout lane.

Shown in FIGS. 9 and 10 are the details of the hinge 95, slide bracket 97, rollers 40, bumper stop 91, and slide track 37. Attachment of the hinge 95 to the checkout module 10 and track slide 37 to the checkout lane 100 allows the rotation and sliding of the checkout module 10 relative to the checkout lane 100. FIG. 10 shows the attachment of the hinge 95 and slide bracket 97, which contains rollers 40 that engage the slide track 37. In certain embodiments, a latch pin 41 may be used to attach the hinge 95 and slide bracket 97. In other embodiments, the latch pin 41 may be removed to allow separation of the hinge 95 and slide bracket 97. This is so that the checkout module 10 may be easily detatched from the checkout lane 100. Further, shown in FIG. 13 is an embodiment of the checkout lane 100 having the slide brackets 97, rollers 40, bumper stop 91, slide tracks 37, latch point 90, and receptacle 81. Also shown in the bagging area 102 and the opening into which a scanner 39 (not shown) is placed. As previously described above, the owner of a checkout lane 100 may add to that checkout lane 100 a scanner 39, slide brackets 97, rollers 40, bumper stop 91, latch point 90, slide tracks 37, and receptacle 81, so that the checkout lane 100 is functional with the checkout module 10 disclosed herein.

Figure 11:
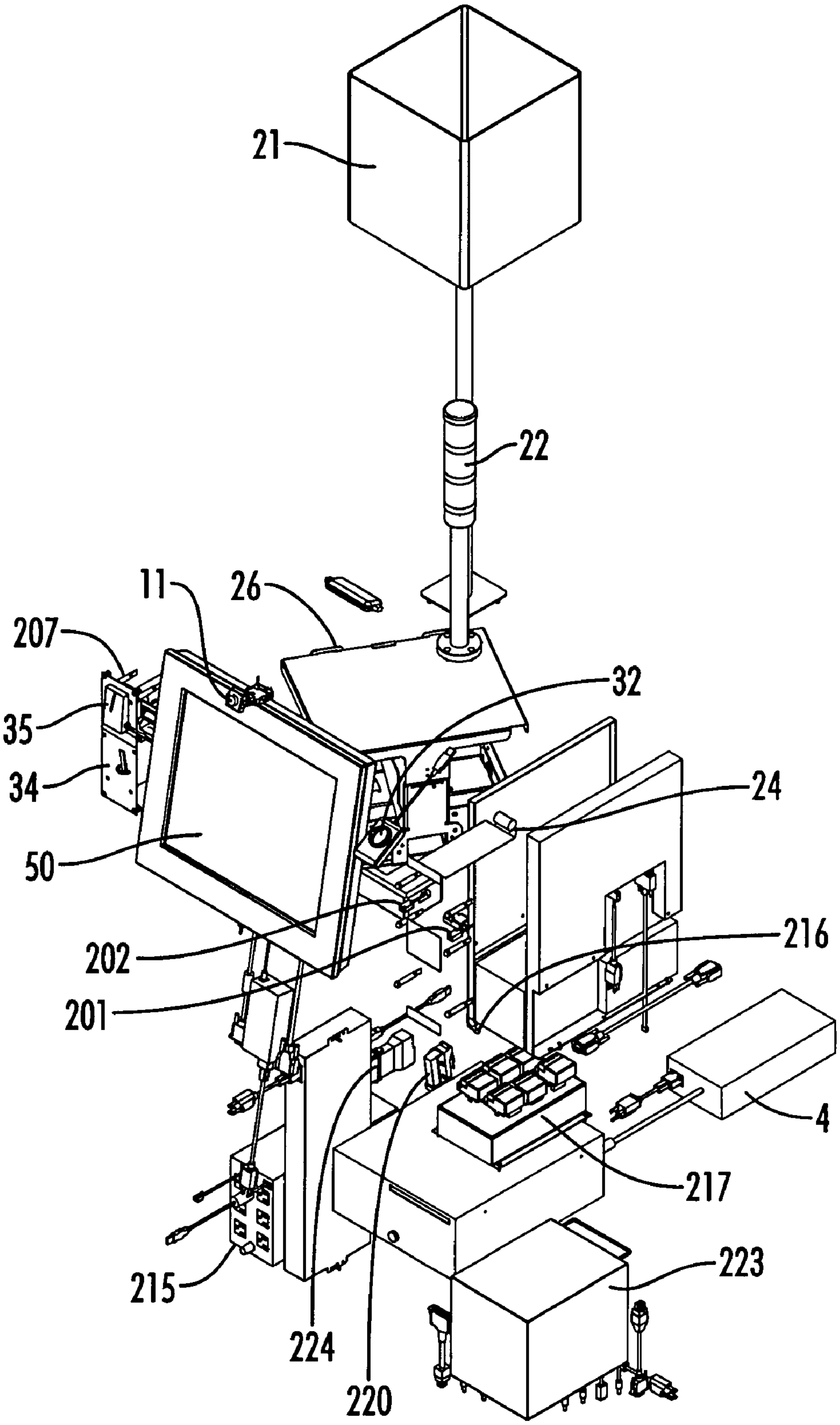
FIG. 11 is a front isometric view of an embodiment of the checkout module having the cabinet, or housing, removed.
Figure 12:
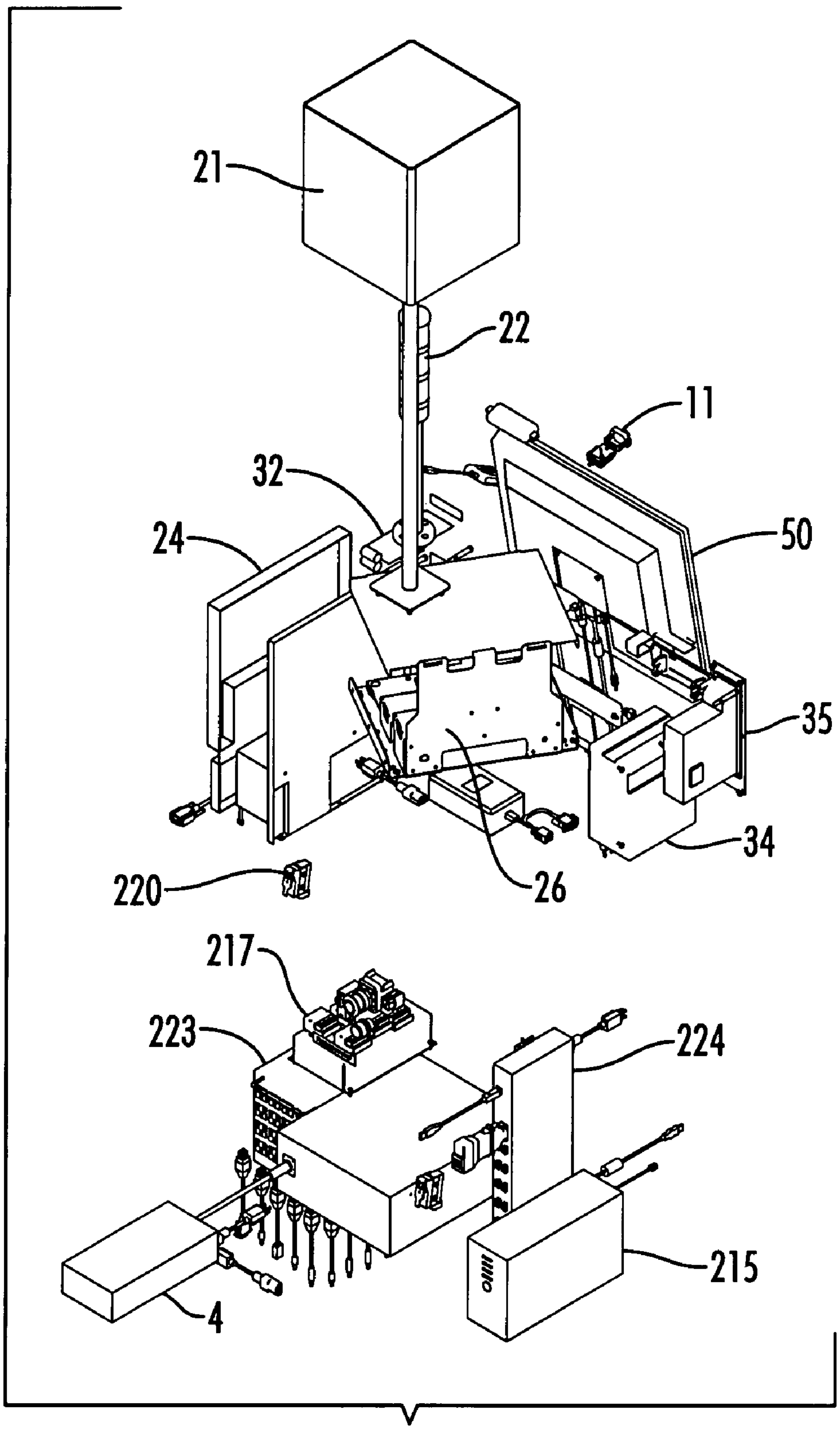
FIG. 12 is a rear isometric view of an embodiment of the checkout module having the cabinet, or housing, removed

Referring now to FIGS. 11 and 12, there are shown exploded views of the checkout module 10 with the cabinet 2 removed. Referring to the checkout module 10, enclosed in the cabinet 2 is a computer processing unit 4 of the type that is widely commercially available having the following minimum specifications: Pentium based processor, 256 MB of RAM, 40 GB hard drive, CD-ROM drive, and full USB capabilities. Also shown therein are the photo emitter 201, photo receiver 202, LED (green) 207, battery backup 215, EPO hardware kit 216, PLC assembly 217, limit switch 220, power supply kit 223, and USB to 16 RS232 device 224. The data cable 14, power cable 15, as well as the other devices incorporated in checkout module 10 that are discussed below, are operationally connected to computer processing unit 4 in manner as understood by those skilled in the art.

Figure 1:
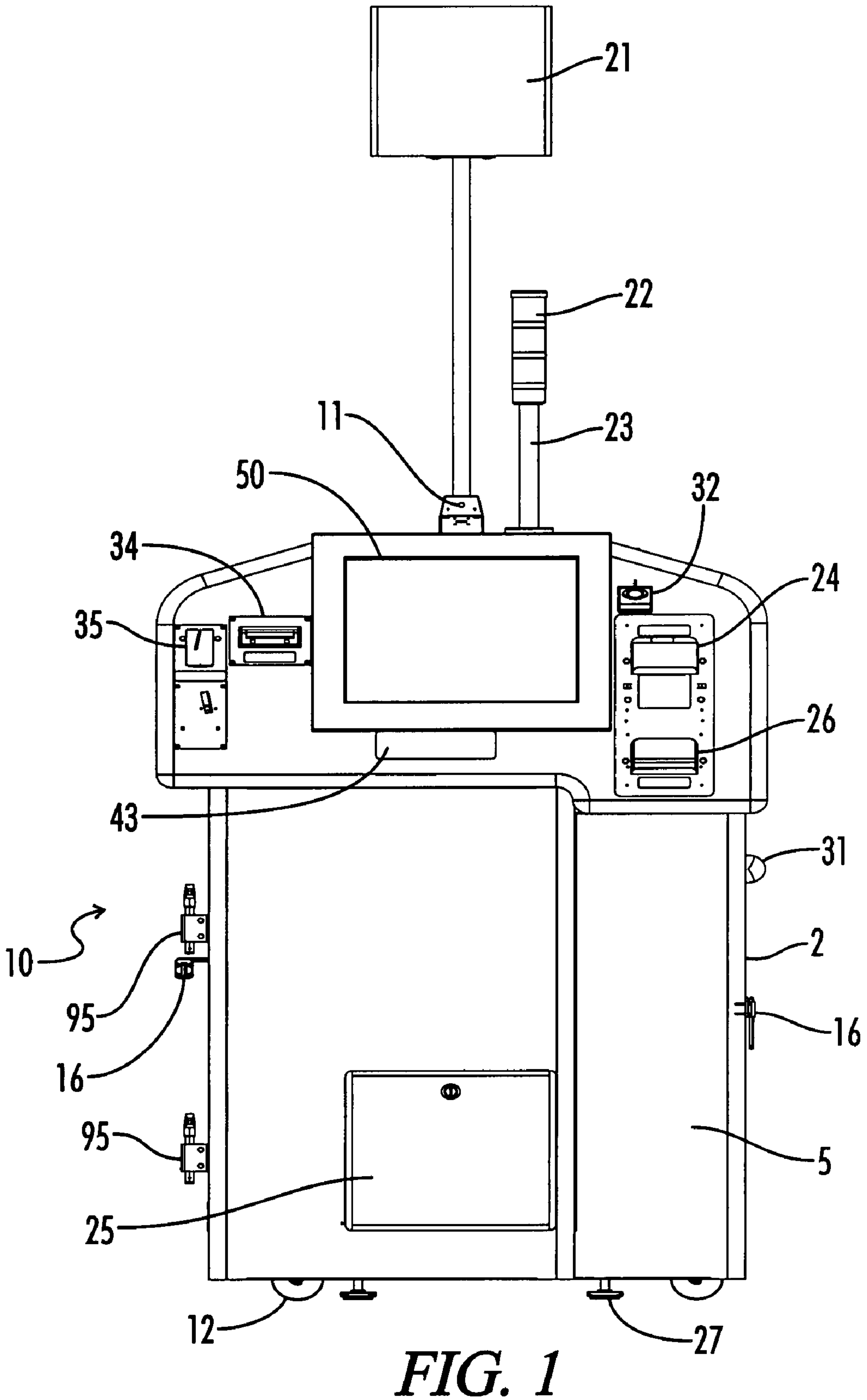
FIG. 1 is a front view of an embodiment of the checkout module.
Figure 2:
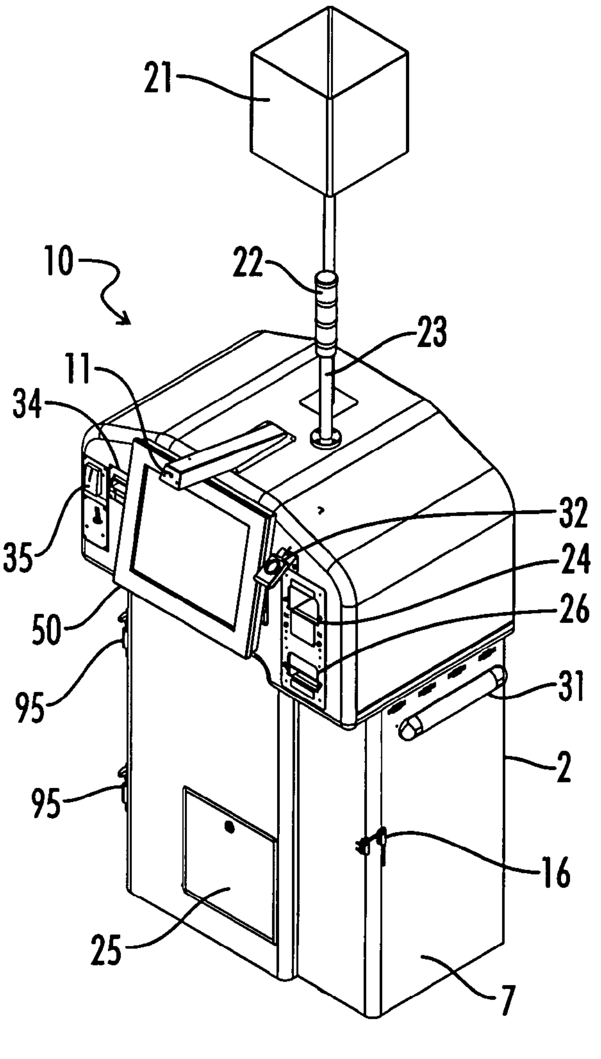
FIG. 2 is a front perspective view of an embodiment of the checkout module.
Figure 3:
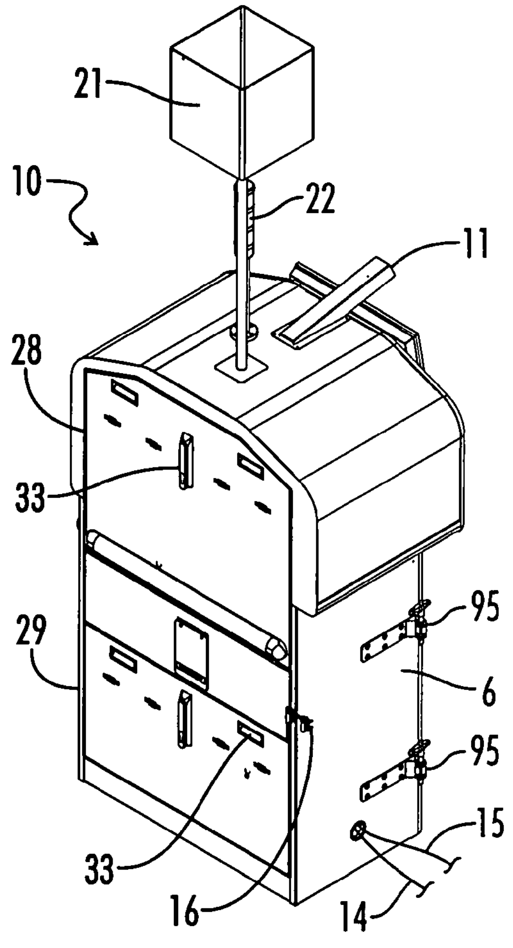
FIG. 3 is a rear perspective view of an embodiment of the checkout module.

Referring now to FIGS. 11 and 12, in addition to FIGS. 1-3, checkout module 10 includes a collection of devices to facilitate payment by the customer for the items purchased. A list of exemplary devices that may be used with the present invention is provided near the end of this section (section I) of this document. These devices, also called payment acceptance devices, may include one or more of the following: a standard EFT terminal 20, an RFID reader 30, paper currency acceptor 34, coin currency acceptor 35, and a biometric identification reader 32. EFT terminal 20 is of the type that is widely commercially available for use with credit cards, debit cards, and loyalty cards having a magnetic strip and may be capable of electronically capturing the customer's signature. RFID reader 30 is of the type that is widely commercially available for use with credit cards, debit cards, and loyalty cards that incorporate RFID technology. RFID reader 30 may also be used for scanning items being purchased that employ an RFID tag. Biometric identification reader 32 is of the type that is widely commercially available and is for use by customers that have allowed their biometric identification to be recorded with the retailer to authorize payment or to take the place of a scannable loyalty card or both. Biometric Identification can also be used for employee identification for accessing the attendant application. Employee access levels and profiles will be setup on the MMS Server. When an employee logs into the system electronic locks can be activated to open and close the cabinet doors, removing the need for any keys to access the cabinet.

In addition to these means for accepting electronic payments, checkout module 10 also includes various other means for accepting payment. To accept payment by cash, checkout module 10 may include a paper currency acceptor 34 of the type that is widely commercially available. Such paper currency acceptor is preferably capable of handling multi-width paper currency and detecting counterfeit currency using upgradeable firmware. To accept payment by coin, checkout module 10 may include coin acceptor 35 of the type that is widely commercially available.

Such coin acceptor is preferably capable of handling world currency and detecting counterfeit currency using upgradeable firmware. To accept payment by check, checkout module 10 may include a check reader 38 of the type that is widely commercially available. Check reader 38 may be a standalone device as illustrated or incorporated into receipt printer 42. An example of such a receipt printer 42 is the Epson TMH-6000 III receipt printer, which is widely commercially available.

In certain embodiments, the checkout module 10 includes a currency dispensing device, such as a paper currency dispenser 24, or coin dispenser 26. In other embodiments, the checkout module 10 also includes a paper currency dispenser 24 of the type that is widely commercially available and that can be configured via upgradeable firmware to dispense multiple denominations of paper currency that may have varying widths. In an alternative embodiment, checkout module 10 may incorporate a commercially available paper currency recycler that is capable of both dispensing and receiving paper currency. Checkout module 10 may also include coin dispenser 26, which is of the type that is widely commercially available and can be configured to dispense world wide coin currency. These devices will allow the retailer to provide change from cash purchases to the customer or cash back to the customer from debit card purchases.

In light of the decreasing use of cash and checks by retail customers in favor of credit and debit cards, checkout module 10 may be configured to accept only electronic payments, i.e. payments made via EFT terminal 20, RFID reader 30, or biometric identification reader 32. In other words, checkout module 10 would not be configured to accept payment by cash or check. In such a configuration, checkout module 10 would not be equipped with paper currency acceptor 34, coin acceptor 35, check reader 36, and coin dispenser 26. Even if configured to accept only electronic payments, checkout module 10 could include paper currency dispenser 24 in light of the fact that many retail customers also desire to get cash back when they make a retail purchase using their debit card.

Referring back to FIGS. 5 and 6, checkout lane 100 also includes a receipt printer 42 of a type that is widely commercially available. Printer 42 is located within the checkout lane 100, an area in which the currency accepting and dispensing mechanisms are not accessible to provide for increased security by allowing the printer 42 to be serviced without having to open the portion of the checkout module 10 that contains currency.

Referring back to FIGS. 7 and 8, there is shown the display screen 50, which is a touch screen display of the type that is widely commercially available and allows the customer to interact with checkout module 10 when prompted. In still another embodiment, the checkout module 10 may include a camera 11 mounted to capture images of consumers. The camera 11 may be operationally connected to a network hub or encrypted wireless system. The information generated by the camera 11 may be stored in the computer processing unit 4 for a predetermined amount of time, allowing review by an employee. Also, video data from the camera 11 may be viewed on the handheld mobile terminal 72, also called the mobile attendant. In certain embodiments, a speaker 13 may be included in the checkout module 10.

As described herein, the present invention includes various embodiments. Accordingly, flexibility exists in terms of the inclusion within the checkout module 10 of a paper currency acceptor 34, biometric identification reader 32, or other element described herein. Stated another way, the checkout module 10 may include additional components as needed to operate in certain circumstances. Shown in FIGS. 11 and 12 is the orientation of certain components of an embodiment of the invention.

Regarding the software side of the invention, software may be installed on the self-checkout PC, also called computer 4, to run the standard customer interface as well as the attendant assistance controls. Those of skill in the art are familiar with computer language such that a self-checkout application may be written based upon the disclosure provided herein. The installation of this software will place a new line item in the registry of the self-checkout PC, also called computer 4, which will contain the serial number, IP address of middleware management system (MMS) and optional redundant MMS, and the key and IV for the 3DES encryption. Example and location of registry values:

[HKEY LOCALMACHINE\SOFTWARE\selfcheck]

"Key"="company A company B"

"IV"="company A"

"Port"="42101"

"Serial"=XXXX-XXXX-XXXX-XXXX

"Primary MMS"=<ip address>

"Secondary MMS"=<ip address>

Each installation will have its own unique serial number, in the form of XXXX-XXXX-XXXX-XXXX. This number will be included in all communication with the MMS. The MMS will check to make sure each lane has a valid serial number, and each serial number is registered.

In certain embodiments, when the software application boots up, it will go straight to the Self-Checkout Start screen 300. This will insure that if for any reason the computer 4 is down or power is out, it would come back up ready to take orders as long as the default boot up value is set to Open. The computer 4 will conduct a variety of checks before it accepts orders. Examples of such checks include the following. The computer 4 will have to establish a connection with the middleware management system (MMS) server 108. If the computer 4 encounters any errors, such as no connection to the MMS server 108 or the MMS reports errors, it will not allow for orders to be placed, and a temporary unavailable screen will be displayed 301. In certain embodiments, a self-checkout application based upon the disclosure provided herein will download customized settings to meet retailer, or user, specific requirements from the MMS server 108. After the previous checks are passed the system will go to the start screen. In other embodiments, the screen 50 may display randomly uploaded images or screens on the PC, keeping the screen safe from image burn-in after a specific amount of inactivity.

Figure 18:
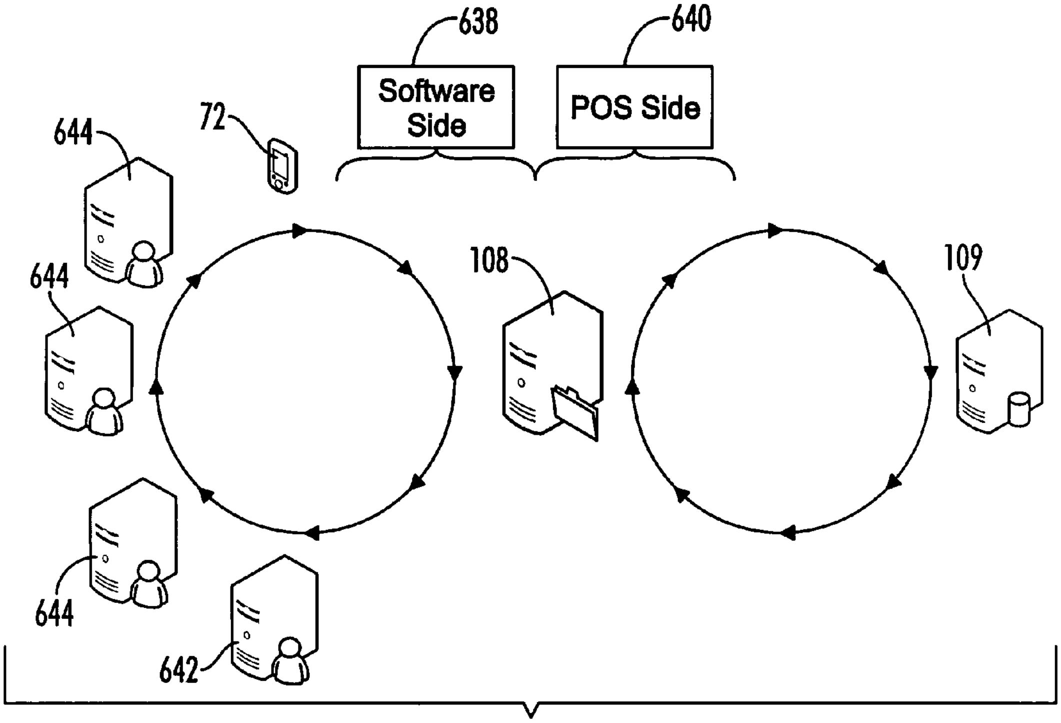
FIG. 18 is a schematic diagram showing the overall communication flow of an embodiment of the present invention. On the left is shown the communication and information exchange between the checkout module, described herein, and the middleware management system server. Shown on the right is the communication and information exchange between the middleware management system server and the point of sale (POS) server. Accordingly, the middleware management system server handles cross communication between the checkout module and POS server.

The MMS server 108 may be a central linux-based server that will handle all communication between separate modules. As best seen in FIG. 18, computers 4 of the checkout modules 10 communicate only with, and directly with, the MMS server 108. A store's or retailer's point of sale (POS) system 109 communicates only with, and directly with, the MMS server 108. Accordingly, the MMS server 108 handles cross communication between the two systems, checkout modules 10 and POS server 109, reducing integration time to a 90 day period. Use the MMS system to configure lanes from the back office. The MMS system provides easy integration for future technology. As shown in FIG. 18, the software side 638 includes communications between the MMS server 108 and the computer 4 of each checkout modules 10, including components such as the hand held mobile terminal 72, epay units 642, and cash and EFT 644. The POS side 640 includes communications between the MMS server 108 and the POS server 109. This abstraction allows each self checkout lane 100 to always stay the same, no matter what POS is on the other side of the MMS. Likewise, the mobile attendants communication is also only through the MMS. All information flow is handled with standard XML commands and lists, as known to those of skill in the art. This open standard and architecture allows easy integration and upgrades with alternate and future technologies.

When the MMS needs to initiate an action on a self-checkout PC, also called computer 4, of a checkout module 10, it sends a command to a custom-made service running on the lane computer 4, encrypted with 3DES, for example. The MMS front-end management interfaces will be accessed with a small wrapper application that displays the GUI in 800×600 resolution. Such small wrapper applications are well known to those of skill in the art. This will allow management to take place on any computer on the store network that has this application installed.

In certain embodiments, a hardware application may be used for proper hardware communication and operation testing. Such an application is well known to those of skill in the art. This program should determine where each device is located on the RS232 hub. This program may be used to test all hardware if there seems to be any problem with communication. This program may be accessed, for example, in the attendant assistance application in the hardware maintenance section. Such a program may be put together by one of ordinary skill in the art. After startup of a station, the application will run and store the hardware configuration in XML format, called the Hardware Control List (HCL).

In certain embodiments of the inventions, real time data transfer may be used to transfer information back and forth between the self-checkout PC, also called computer 4, MMS server 108 and the POS server 109. This will allow for credit card verification and capture, gift card, etc. The real time transfer should be seamless to the customer and fast. All UPC, coupon, product description, pricing, etc. is streamed from the POS system when the customer scans each product. Each store, or retailer will require a different process between the MMS and POS systems. With that said, the process of communicating information from the self-checkout PC, also called computer 4, and the MMS server 108 will stay constant. Based upon this disclosure, those of ordinary skill in the art may handle the differences noted above. Access will be required to each store's, or user's, network or individual store networks in order to communicate data from each self-checkout PC, also called computer 4, to the MMS and POS system. If a store desires encrypted wireless, it can be added into the self-checkout PC and allow for easier installation or remote self checkout location where store networkability is not available, for example like a bakery location. A wireless access point will have to be placed in the store to accommodate this solution. In certain situations, it may not be recommended to use a wireless solution, and a hardware network connection may be used. All hardware may be communicated through a standard rs232 connection, or equivalent. As those of ordinary skill in the art are aware, during integration, details regarding information gathering and interfacing with the POS system to the MMS system will need to be handled. Those of ordinary skill in the art are familiar with such steps. The information may be transferred in a standard file format that the MMS system can import into its internal database The following is an exemplary hardware list of the components of an embodiment of the invention. One of ordinary skill in the art may properly connect these components with the assistance of the disclosure contained herein. In certain embodiments, the self-checkout PC, also called computer 4, should have, as a minimum, USB support, a Pentium processor, Windows XP Professional, 256 RAM, 40 GB hard drive, CD ROM (If VPN is not used). In certain embodiments, the default self-checkout PC, which is commercially available from DigiPos, should have a Pentium® 4 630 with HT 3 GHz processor, 1 GB of Ram, Windows XP Professional, Ultra Small Form Factor for spacing savings, 80 GB hard drive, 24×CD Rom, mounting bracket. In certain embodiments, there may be a speaker 13 built into the monitor which surrounds the video display 50. In certain embodiments, a UPC power supply 114 may be used to protect against various power surges that might occur in the store or in the event of power loss, which is commercially available from APC Back-UPS, model no. CS 500VA. In certain embodiments, a touch screen device, also called a video display 50, preferably a mountable solution that is built into the checkout module 10 is included. It will need either RS232 communication or a PS2 mouse port that will transfer the mouse coordinates to the PC when a customer selects a specific location, and is commercially available from DigiPos, as a 17" external mount with a speaker 13. In certain embodiments, two small cameras 11 may be placed above the scanning area, one showing items scanned and the other showing the individual customer's face. Such cameras 11 are commercially available having a one inch pinhole lens. In certain embodiments, a USB camera cable may be attached. The camera feeds to a coax to USB converter and is connected to a USB slot located on the self-checkout PC. A video capture cable is commercially available from RCA. In certain embodiments, a scanner 39 may be a UPC product scanning device with RS232 communication protocols. This scanner may have to have a built in scale for weight calculation of specific products, and are commercially available from Magellan, as model no. 9500—mid:1001. In certain embodiments, a scanner may be a wireless, handheld scanner with docking station and RS232 protocols, which is commercially available from PSC, as model no. PSRF 1000—mid:2001. In certain embodiments, a weigh station may be a security device added to allow for weight verification after products are placed into the bagging area 102, and is commercially available from Shekel, as model no. mid:7501. In certain embodiments, a stack light 22 may be an overhead indication light to show lane activity and alert an employee if a customer requires additional attention. The stack light 22 may have green, amber, and red lights. These lights may be connected to the PLC to be operated by the unit, and are commercially available from Allen Bradley. In certain embodiments, a credit card terminal screen with RS232 protocols, and the ability to capture electronic signatures may be used and is commercially available from Hypercom, model no. mid:6001. In certain embodiments, may include a paper currency acceptor 34 that is a bill collector with built in RS232 protocols. Such a bill acceptor is commercially available from Cashflow, model no. SC6607 (Main unit)—mid: 4001, 252067014P1 (universal bezel), 252260006P1 (Power supply). In certain embodiments a coin acceptor 35 with built in RS232 protocols may be used and is commercially available from Cashflow, model no. 9500 (Main unit)—mid:4501, H1URS232 cable #794188001 (Cable), 7819 (Coin front plate), 72-11-0362 (Coin mounting kit). In certain embodiments, a paper currency dispenser 24 is included and allows bills to be dispensed to the end customer with RS232 protocols. Such paper currency dispensers 24 are widely commercially available. In certain embodiments, the embodiment may include a coin dispenser 26, which is a device that will allow coins to be dispensed to the end customer with RS232 protocols. They are commercially available from CoinCo. In certain embodiments, the invention includes a sixteen port RS232—USB hub 118 so that all devices will communicate directly with this unit and be sent to the USB port on the PC, USB-16COM-RM USB to 16COM RS-232. In certain embodiments, the PLC will be located inside of the self-checkout unit to control standard inputs and outputs. The PLC is commercially available from EZ PLC, model no. X-32—mid:8001. In certain embodiments, there is an input/output board, I/O module, to operate the lighting, switches, etc. The I/O module has a relay out module of 3 light outputs for lane light, 4 LED light outputs for customer transaction awareness, 2 electronic lock outputs for 4 locks, 20 outputs to cycle power to any of the various devices in the cabinet including the PLC itself. The I/O module has an input module of two door limit switches for door status monitoring, and one coupon sensor to detect the pass through of a coupon into the coupon slot. In certain embodiments, there is a coupon collector with document sensor to allow coupons to be inserted after a coupon is scanned. This photoelectric sensor may be connected to the PLC and is commercially available from World-Beam, model no. Q12 Q126E, World-Beam Q12 Q12AB6R. In certain embodiments, there may be a check reader 36 and receipt printer 42 for the ability to verify checks at the checkout module 10 without attendant assistance. This check reader 36 may also serve as the receipt printer 42. This device will have to have USB communication and is commercially available from Epson, model no. TMH6000II—mid: 3001. In certain embodiments, there may be LED lights around hardware to call attention of customer for action: coin, cash, coupon slot, and there may be 8 LED lights total. In certain embodiments, there may be a biometric fingerprint sensor 32 for customer identification and security. In certain embodiments, there may be electric locks to allow an attendant to lock and unlock access doors 25 of the checkout module 10 without keys. By way of a specific example, in certain embodiments, the checkout module 10, which may include sixteen RS232 devices, may include a touch screen 50, scanner 39, PLC, weight station in bagging area 102, EFT 20, paper currency acceptor 34, coin acceptor 35, paper currency dispenser 24, coin dispenser 26, wireless scanner 39, and UPC power supply 114.

With reference to the handheld mobile terminal 72, also called mobile attendant, it may be a handheld device to allow remote access, such devices are commercially available from Symbol, as model no. MC50. The mobile attendant 72 allows wireless access so that the user can be anywhere in the store and be responsive. The mobile attendant 72 will not accept payment options and will serve as a simple management tool to help make the checkout process smooth and easy for the end customer.

Also disclosed herein is the MMS server 108. By way of example, an embodiment of the MMS server 108 may include a Dell OptiPlex GX620 Mini-Tower, Pentium® 4 630 with HT 3 GHz processor, 1 GB of Ram, ultra small form factor for spacing saving, 80 GB hard drive, 48×CD Rom, having a keyboard, mouse, and monitor. The MMS server 108 is available to provide store reports and allow employees to manage specific administrative tasks. It also gives the store manager the ability to monitor self-checkout usage from behind the scenes.

Figure 19:
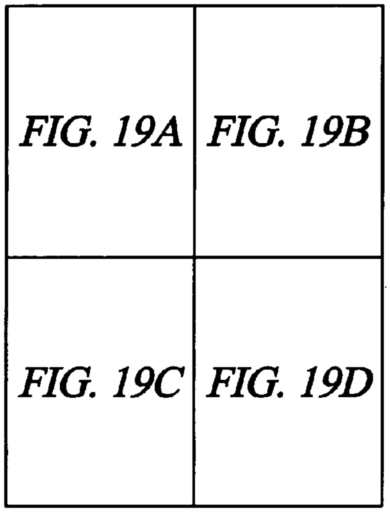
FIGS. 19A, 19B, 19C, and 19D make up FIG. 19 which is a flow chart showing an embodiment of the tasks that may be performed upon logging into the middleware management system and interfacing with checkout module computers.
Figure 19A:
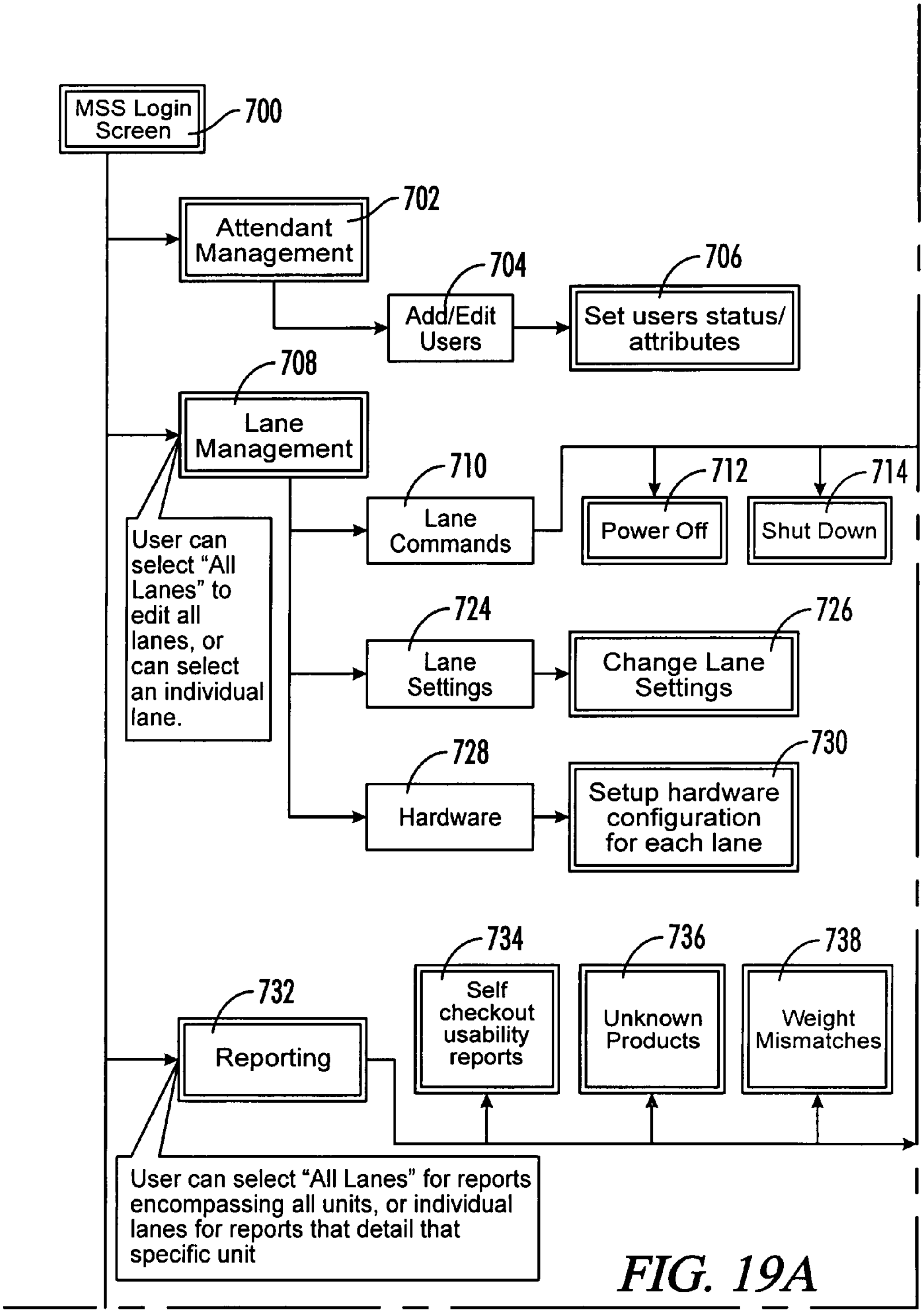
Figure 19B:
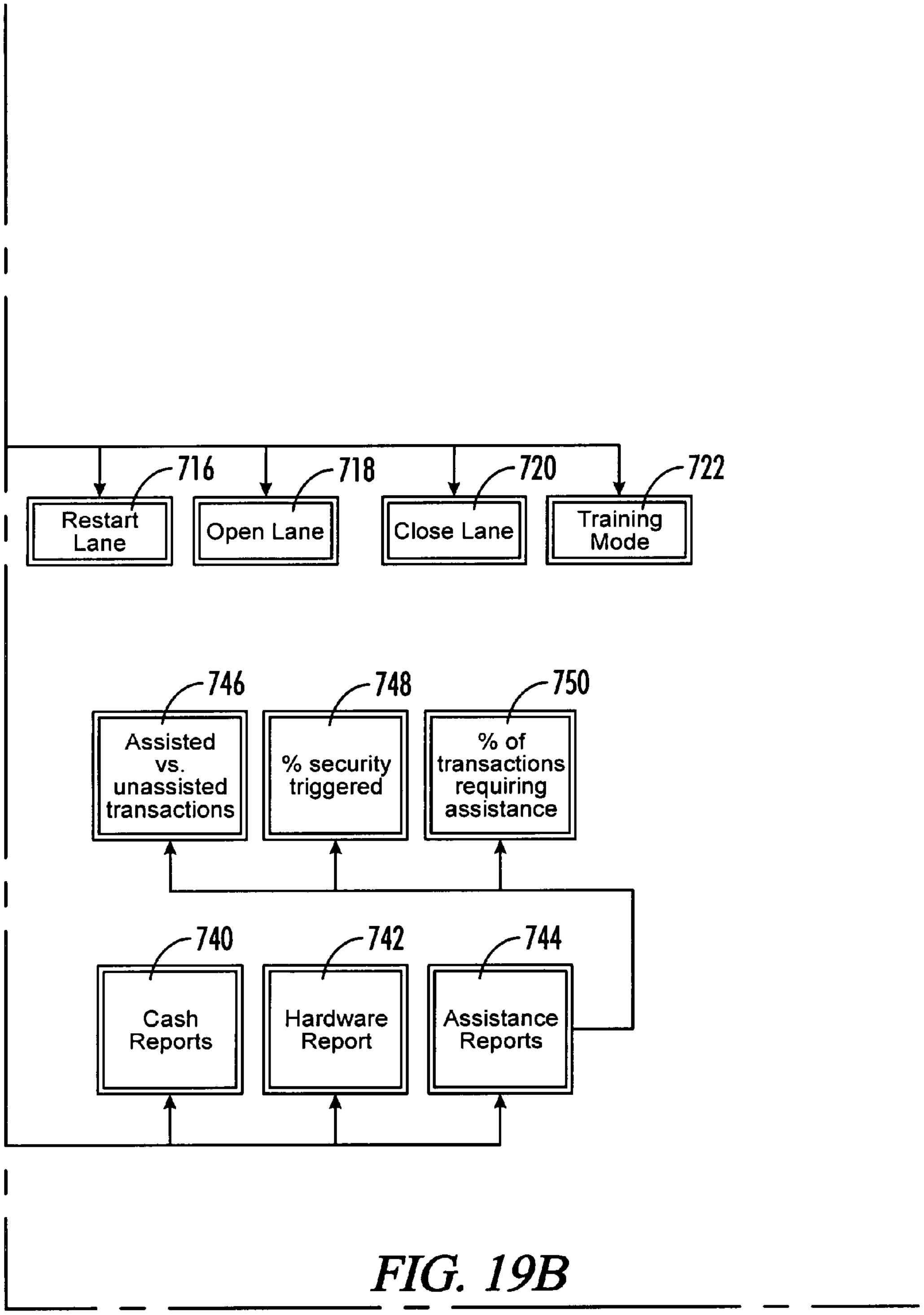
Figure 19C:
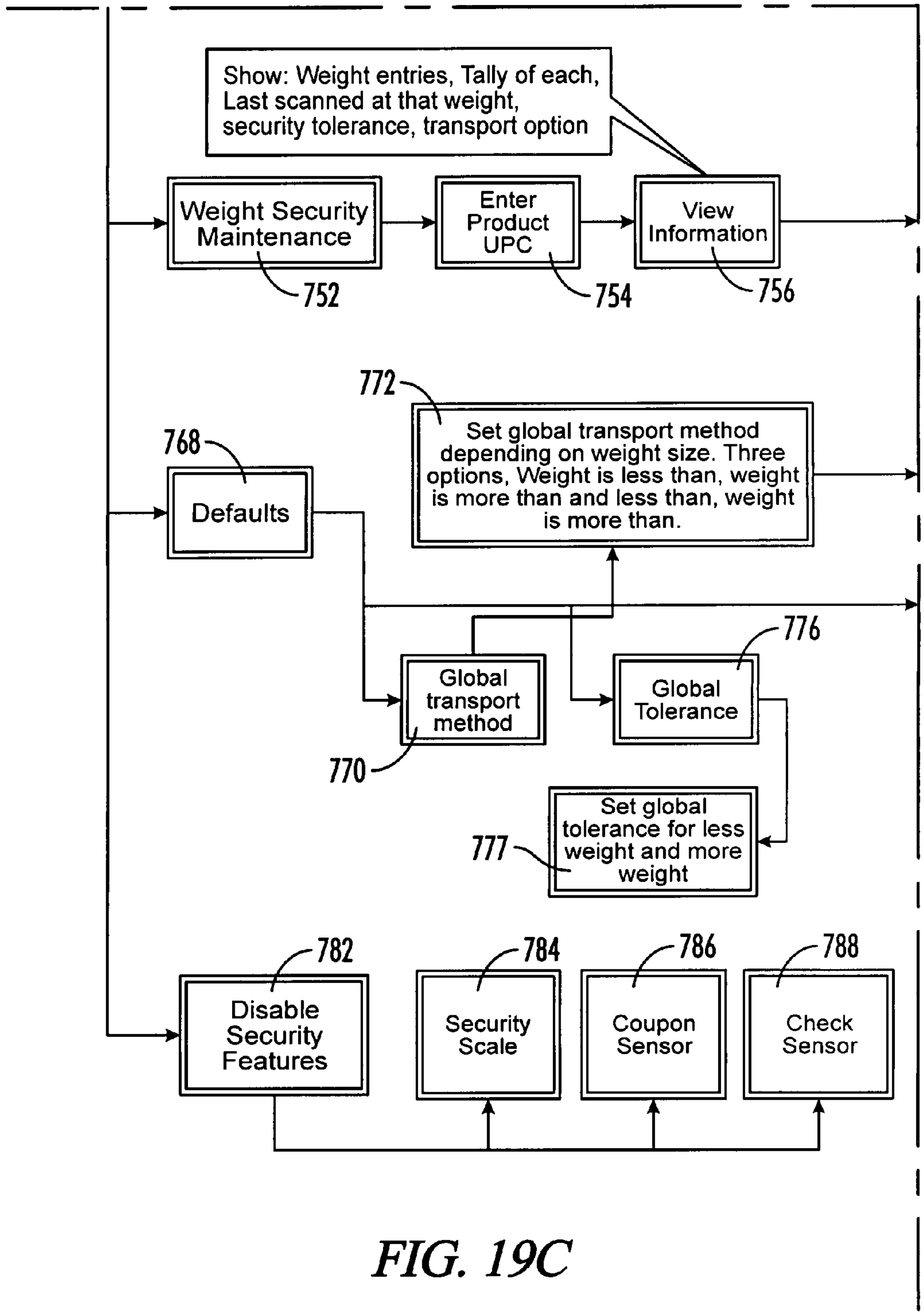
Figure 19D:
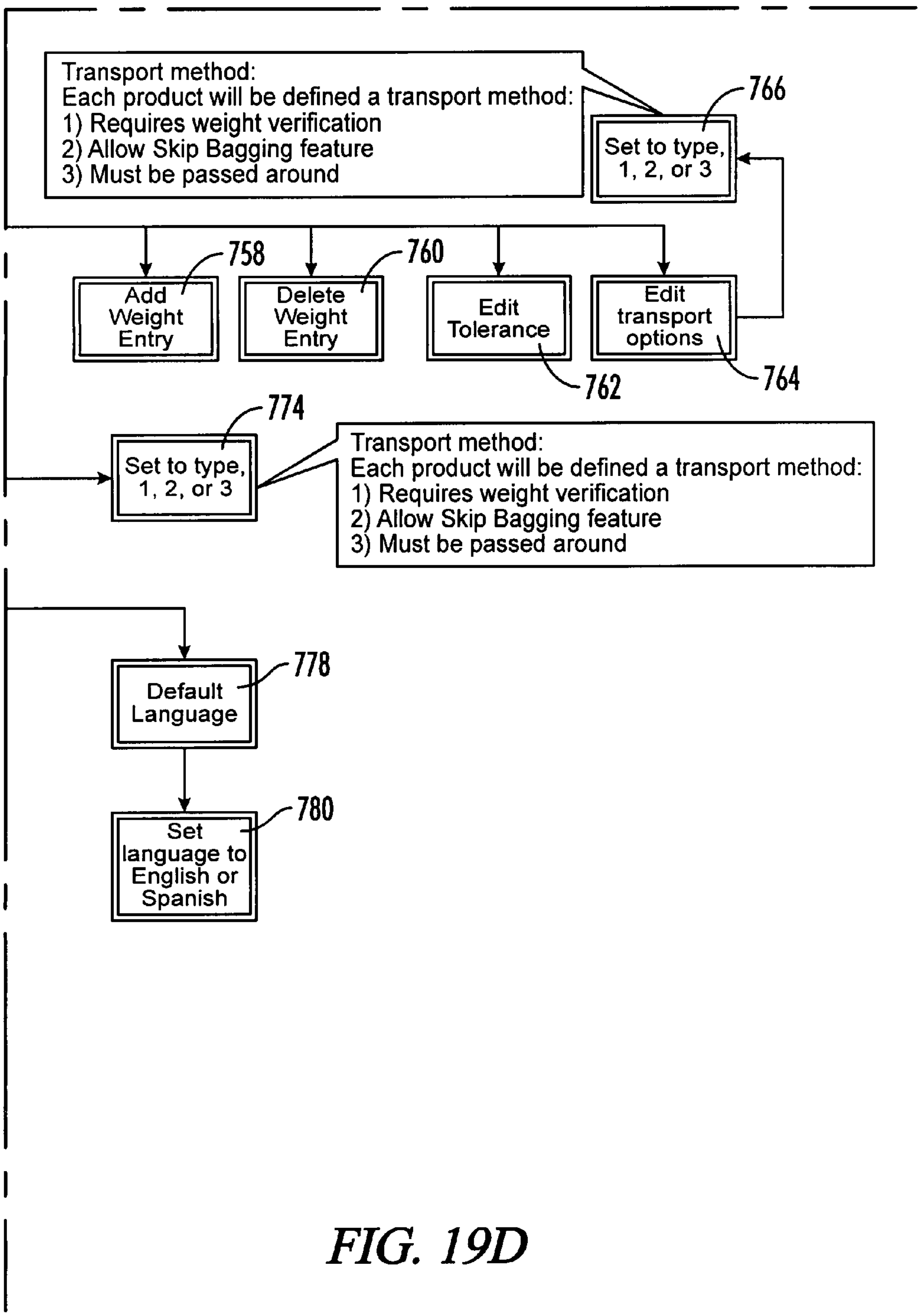
Figure 20A:
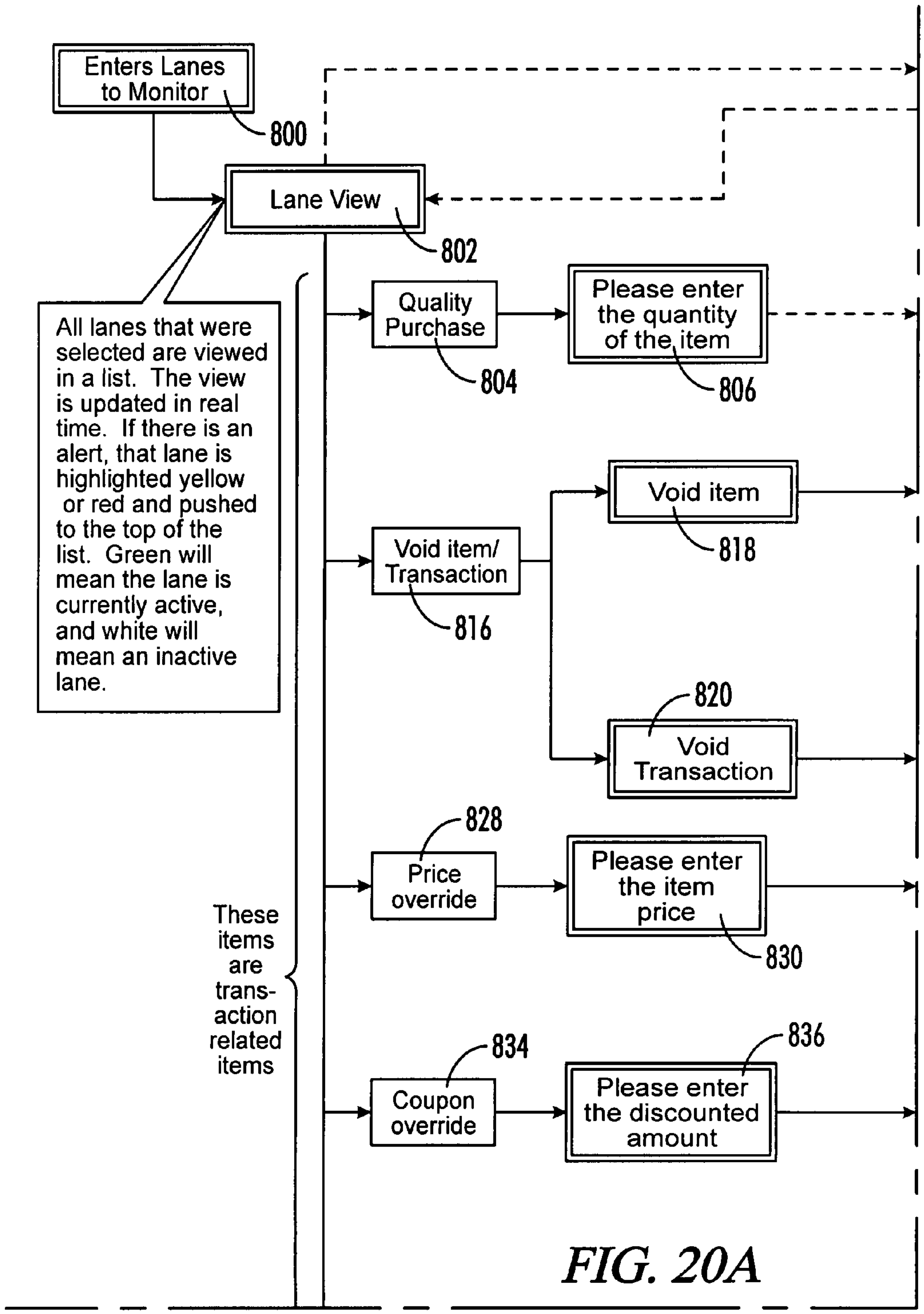
FIGS. 20A, 20B, 20C, 20D, 20E, and 20F make up FIG. 20 which is a flow chart showing a process of managing multiple checkout modules at checkout lanes through a hand held terminal, also called the mobile attendant.
Figure 20B:
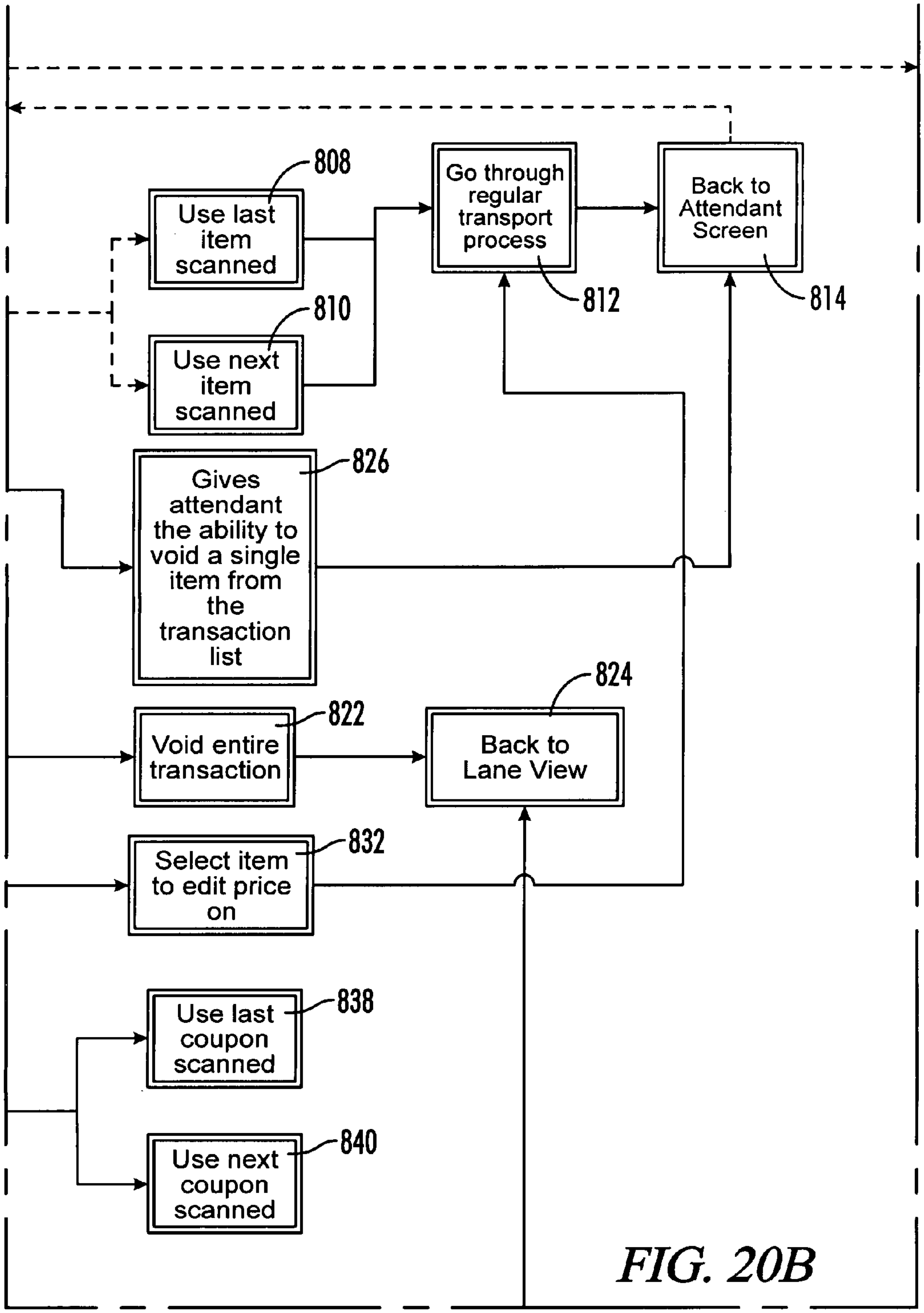
Figure 20C:
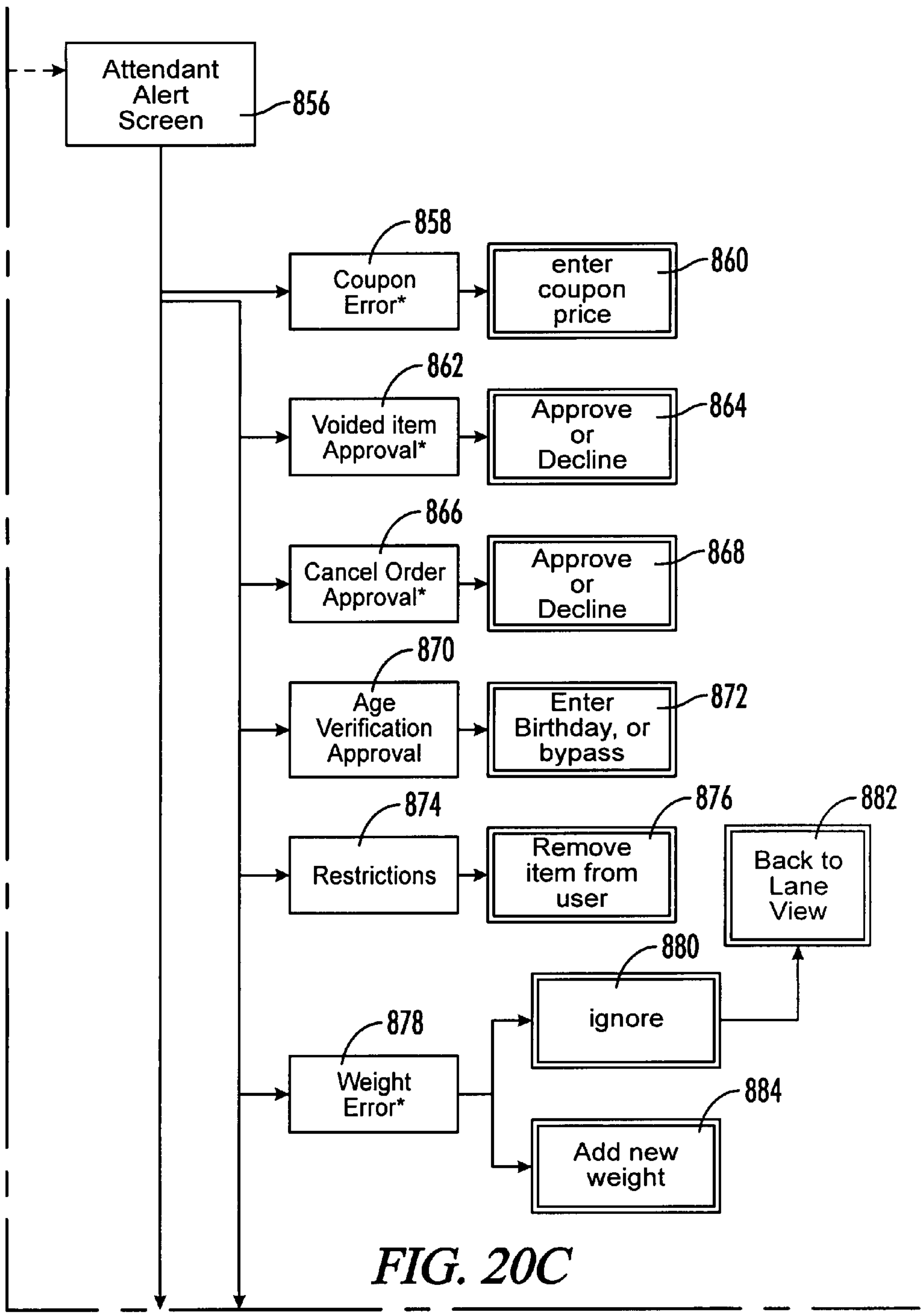
Figure 20D:
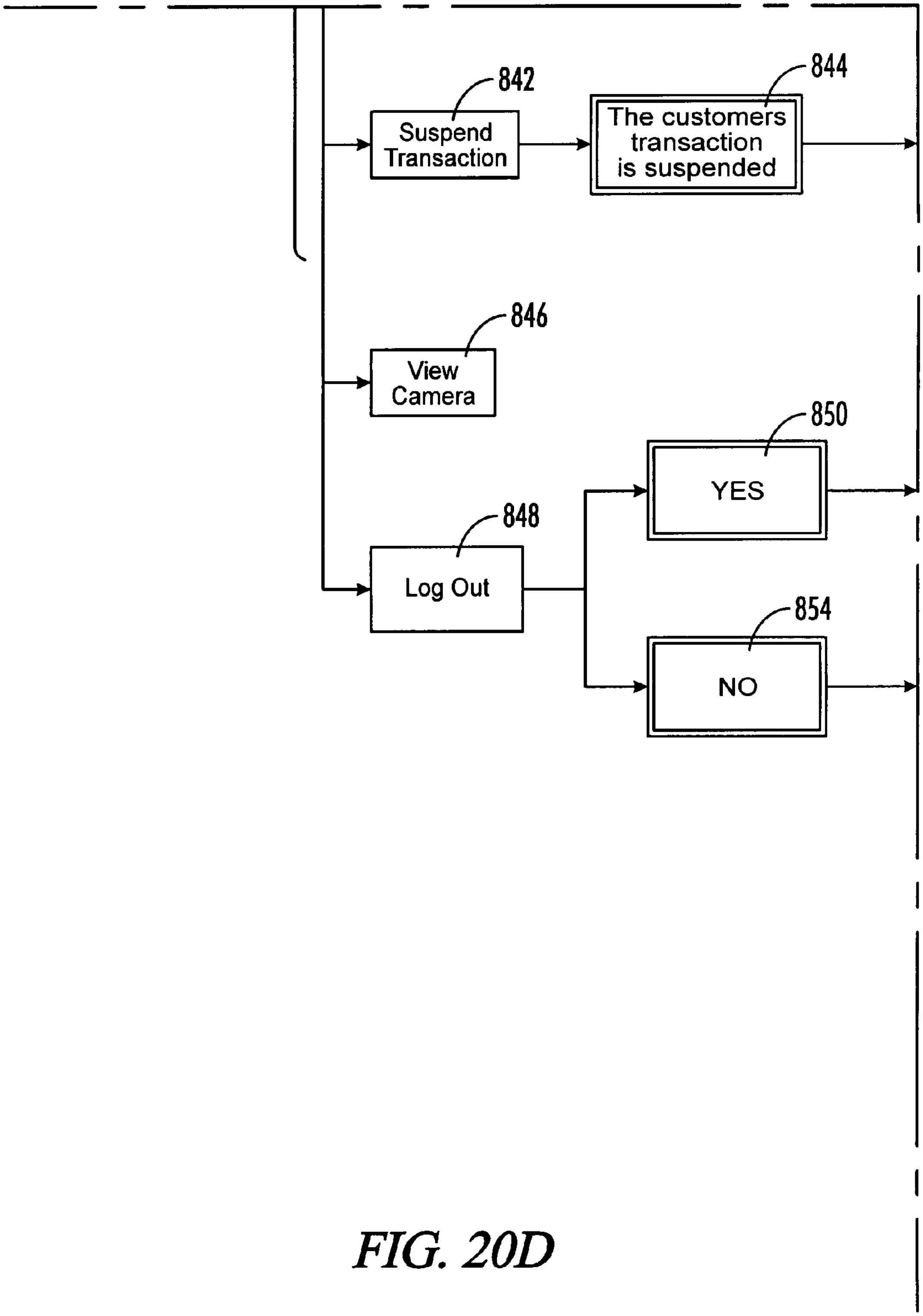
Figure 20E:
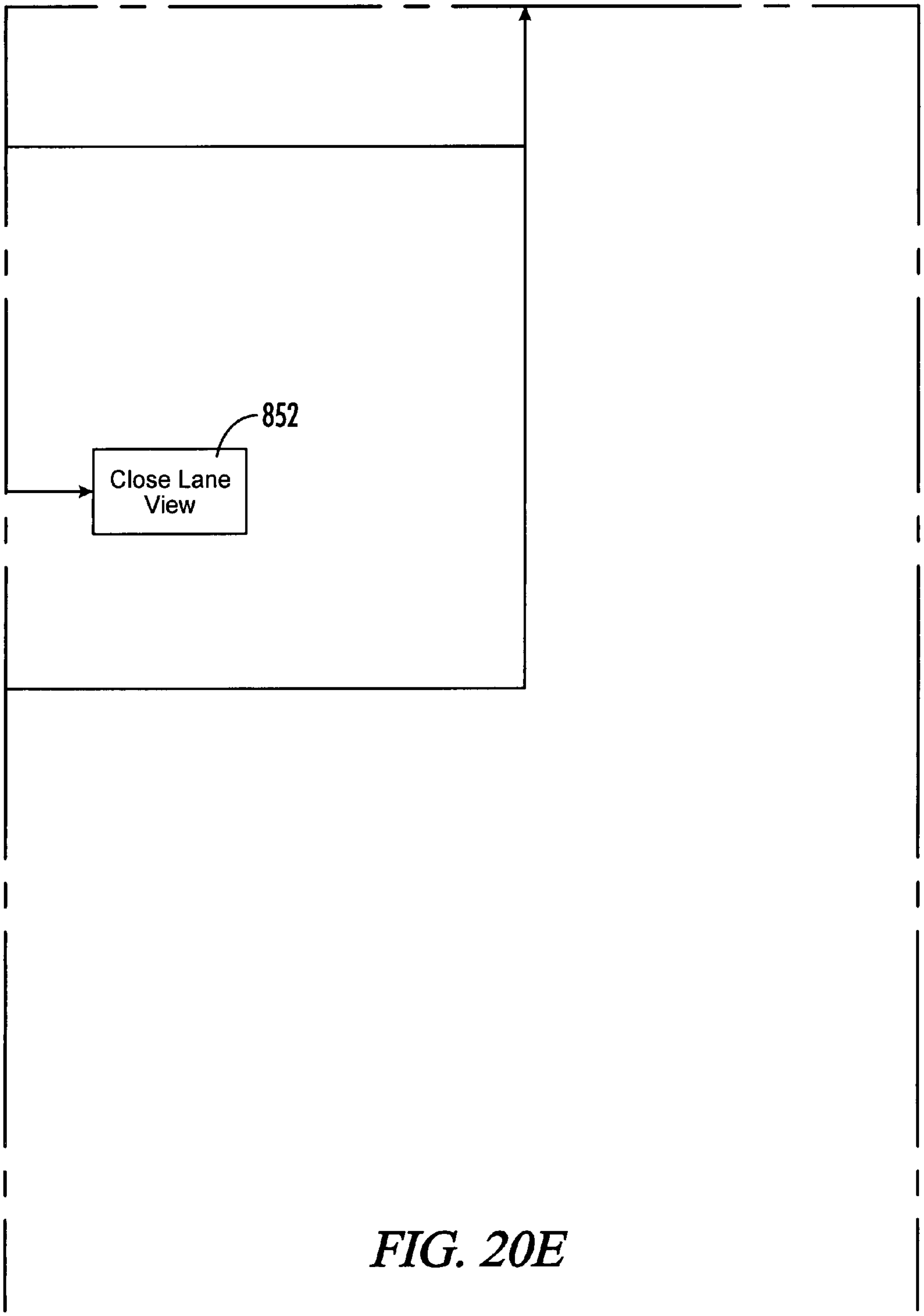
Figure 20F:
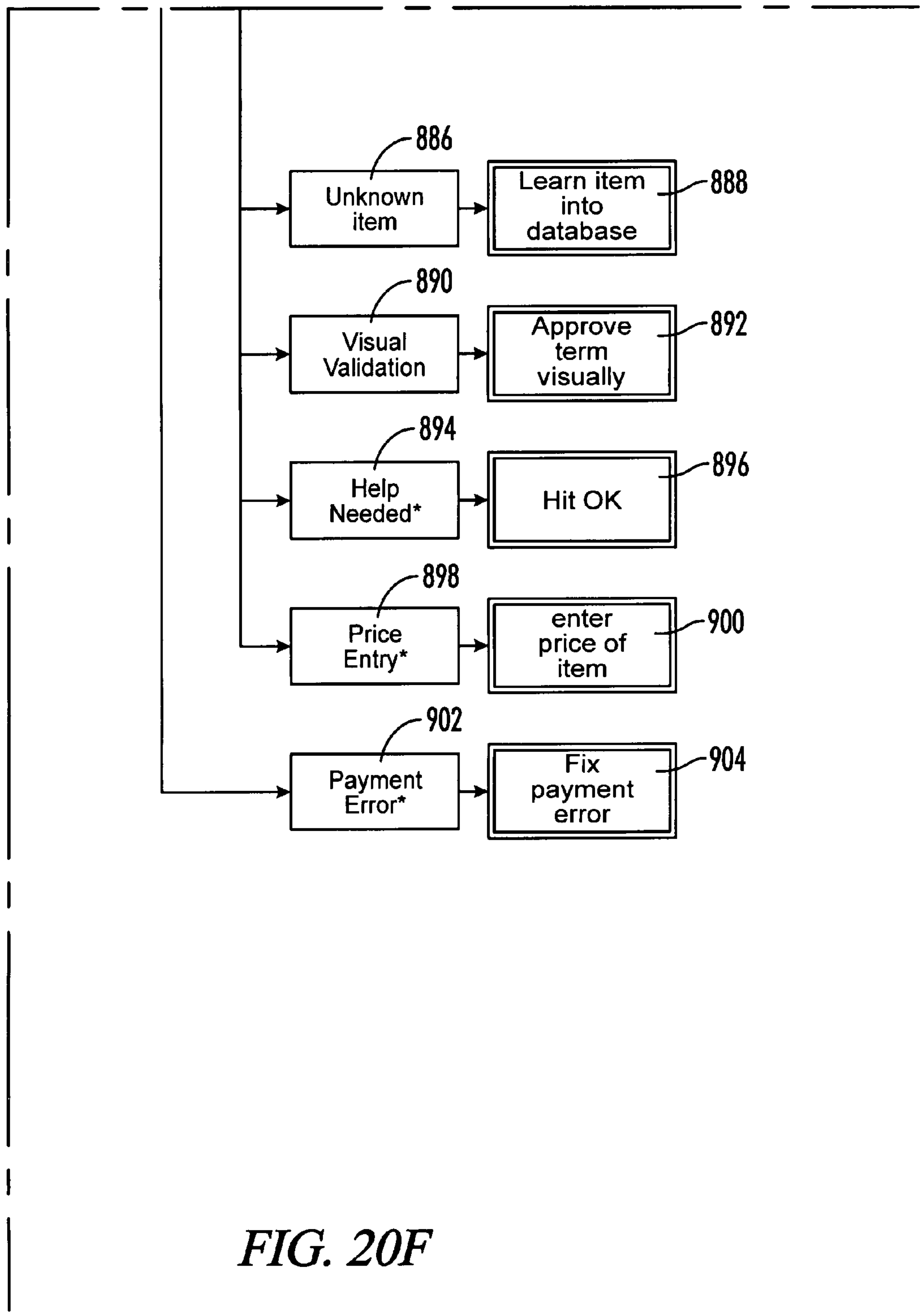

Referring now to FIG. 19, which is made up of FIGS. 19A, 19B, 19C, and 19D, there is shown a flow chart of the actions which may be taken by the MMS system. In certain embodiments, the MMS system, allows changes related to users/managers, editing characteristics of the individual checkout lanes which are communicating with MMS, as well as the other actions shown. Specifically, at the login screen 700, changes may be made to attendant management 702, lane management 708, reporting 732, weight security maintenance 752, defaults 768, and security features 782. Attendant management 702 includes adding or editing users 704, and setting user attributes 706. Lane management 708 allows lane commands 710, such as power off 712, shut down 714, restart 716, open lane 718, close lane 720, and training mode 722. Lane settings 724 allows changes to lane settings 726. Hardware 728 management allows setup of hardware configuration for each lane 730. Reporting 732 allows for the generation of reports, such as self checkout usability 734, unknown products 736, weight mismatches 738, cash report 740, hardware report 742, assistance report 744, assisted versus unassisted transactions 746, percentage security triggered 748, percentage of transactions requiring assistance 750. Weight security maintenance 752 allows entry of product UPC 754, viewing information 756, and modifications may be performed, such as adding a weight entry 758, deleting a weight entry 760, editing a tolerance 762, or editing a transport option 764, which includes allowing a pass around 766. Setting the defaults 768 allows a global transport method 770 to be set 772 to a defined 774 transport method. A global weight tolerance 776 may be set 777. A default language 778 may be set 780 to English or another language. Finally, security features 782 may be disabled, such as security scale 784, coupon sensor 786, or check sensor 788.

Shown in FIG. 20, which is made up of FIGS. 20A, 20B, 20C, 20D, 20E, and 20F, is a flow chart of the actions available from the mobile attendant, also called the handheld mobile terminal 72, which is described elsewhere herein. A user of the mobile attendant enters the checkout lanes to monitor 800. All checkout lanes that are selected are viewed in a list. The view is updated in real time. If there is an alert, that lane is highlighted and pushed to the op of the list. The highlighting may be yellow or red, for example. Coloration may be used to indicate the activity of a checkout lane. For example, a green color may mean that a certain checkout lane is currently active, whereas a white color may mean that a certain checkout lane is inactive. When viewing lanes 802 on the handheld mobile terminal 72, useful activities may be performed, the attendant may, for example, enter the quantity of a purchase 804, void an item or transaction 816, perform a price override 828, coupon override 834, suspend the transaction 842, view the feed from the camera 846, or logout 848, in which an affirmative 850 or negative 854 response is needed to close the checkout lane view 852. The quantity purchase 804 requires the entry of the quantity of the item 806 by using the last item scanned 808 or the next item scanned 810, followed by the regular transport process 812 and going back to the checkout lane view screen 814. Voiding an item or transaction 816 requires electing whether to void an item 818 or transaction 820, then the single item is voided 826, or the entire transaction 822, in which case there is a return to the checkout lane view screen 824. A price override 828 calls for the entry of the item price 830, then selecting the item to edit the price of 832. This is similar to a coupon override 834, in that a coupon override calls for the entry of the discounted amount 836 and the selection of the last coupon scanned 838 or the next coupon scanned 840. When a customer's transaction is suspended 844, the checkout lane view screen 824 is returned to.

Still referring to FIG. 20, the attendant may respond to an attendant alert screen 856, while using the handheld mobile terminal 72. If there is a coupon error 858, they may enter the coupon price 860. If voided item approval 862 is needed, they may approve or decline 864. If a cancel order approval 866 is needed, they may approve or decline 868. If age verification 870 is needed, they may enter a birthday 872 or by pass. If there is a restriction 874, they may remove the item from user 876. If there is a weight error 878, they may ignore 880 it or add a new weight 884. If there is an unknown item 886, they may learn item into database 888. They may provide a visual validation 890, and approve the validation 892, receive a request for help 894 and acknowledge 896 the request. If there is a price entry matter 898, they may enter the price of the item 900. If there is a payment error 902, they may fix it 904.

Figure 21:
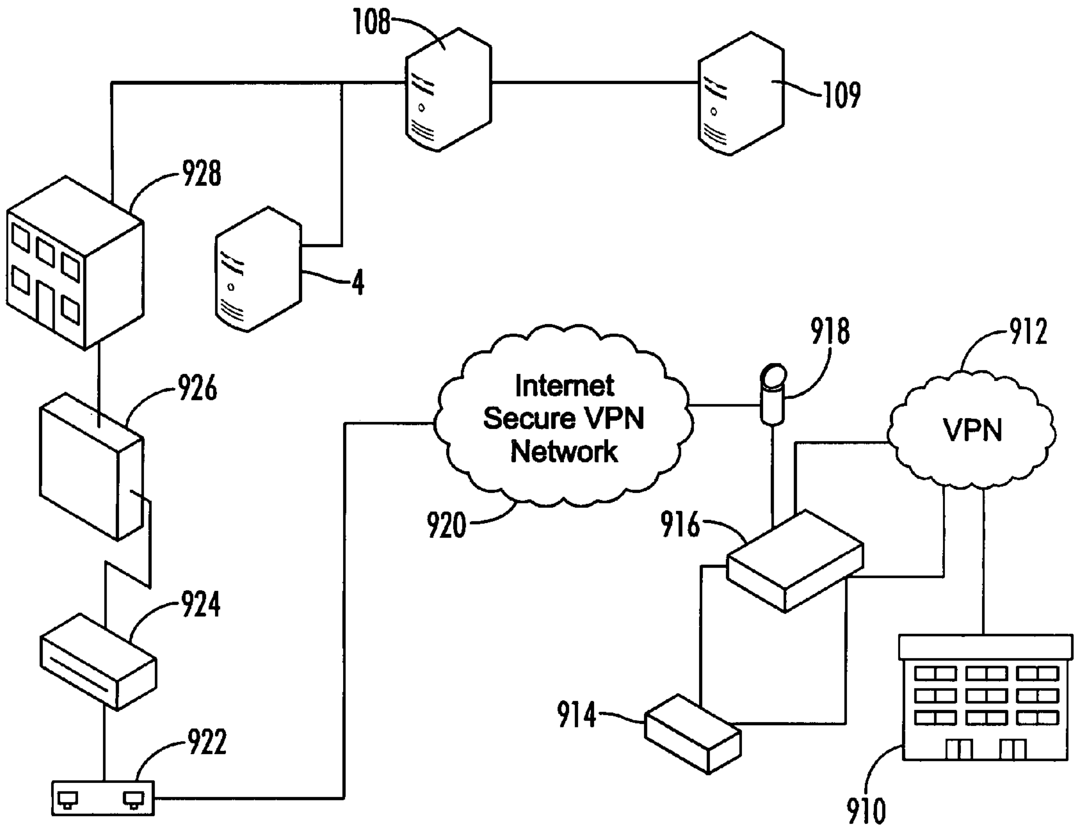
FIG. 21 is a schematic diagram of the VPN network used to remotely update and monitor the computers of the checkout modules, mobile attendants and the middleware management system server.

Finally, shown in FIG. 21 is an embodiment of the VPN connection pattern of the invention. Shown there is POS server 109 and MMS server 108 information sharing. Also, the MMS server 108 sends upgrades to the self checkout computer 4. There is upgrading and monitoring between the MMS server 108 and the store 928. Finally, shown is the firewall 926 communicating with a router 924, to the DSL 922, to the secure VPN network 920 through fiber optics 918, to a media converter 916, to the VPN 912 of the main office 910. A backup battery 914 may also be used.

II. Using Checkout Module in a Conventional Attended Lane

The method for using checkout module 10 in an existing conventional checkout lane 100 first requires having a data receptacle 80 and power receptacle 81 added to the wiring of the conventional check lane. Data receptacle 80 (best seen in FIG. 13) must be configured to accept data connector (not shown) on cable 14. Data receptacle 80 includes only data connections such as the output from the scanner/scale in the existing checkout lane 100, the output from any security device, such as a light curtain or a scale for weight verification, used by the checkout lane 100, the data connection to the retail store's software, and the data connection to cash drawer 70, if this feature is used. Some older checkout lanes may also require retrofitting with a security device, such as a scale for weight verification or a light curtain, if the retailer determines such a feature is necessary. Power receptacle 81 is a standard electrical power receptacle, and if such a receptacle is conveniently located in the existing checkout lane 100, an additional power receptacle 81 may not be required. Power cable 15 has a connector (not shown) which is received by power receptacle 81. The next step requires the installation of latch points 90 (best seen in FIG. 13) for latches 16 to latch onto. The electrical and data connections required for this conversion are of the type widely known to those of ordinary skill in the art. Further details of those operational connections are described below and shown in FIGS. 14 and 15.

Figure 4:
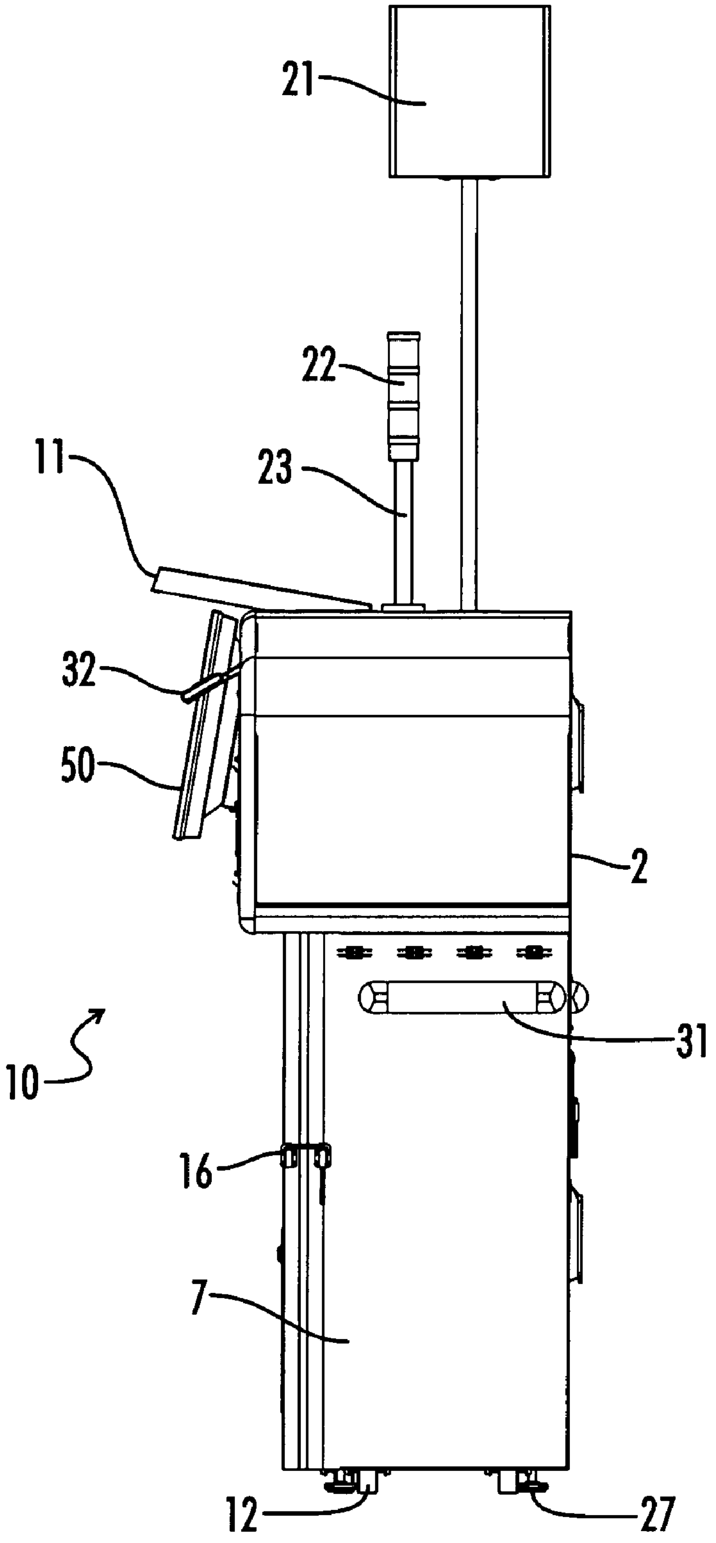
FIG. 4 is a side view of an embodiment of the checkout module.
Figure 14:
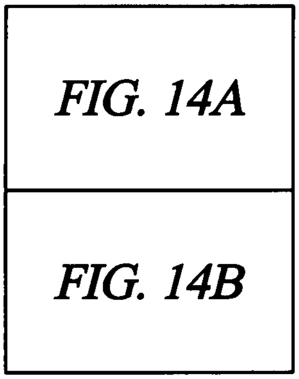
FIGS. 14A and 14B make up FIG. 14 which is a schematic diagram of the checkout module showing the types of connections of the individual elements of an embodiment of the invention.

Once these preliminary steps are done, data connector (not shown) of the checkout module 10 is plugged into to data receptacle 80 to provide the necessary data connections. Power connector (not shown) of cable 15 is plugged into power receptacle 81 to provide the necessary power to checkout module 10. Latches 16, if used, are latched onto latch points 90. Data receptacle 80, power receptacle 81, and latch points 90 are best seen in FIG. 4. The system is then powered up. Once this is complete, the checkout lane 100 is ready to be operated with checkout module 10. Rotation and sliding of the checkout module 10, as described above, and communications from the MMS dictate whether the invention is used as a self-checkout unit or a traditional attended unit. The computer processing unit 4 communicates with the middleware management system via operational connections described herein. Communication with the MMS allows the computer processing unit 4 to download any customized settings. A hardware diagram showing the types of connections of an embodiment of the present invention is shown in FIG. 14, which is made up of FIGS. 14A and 14B.

Figure 14A:
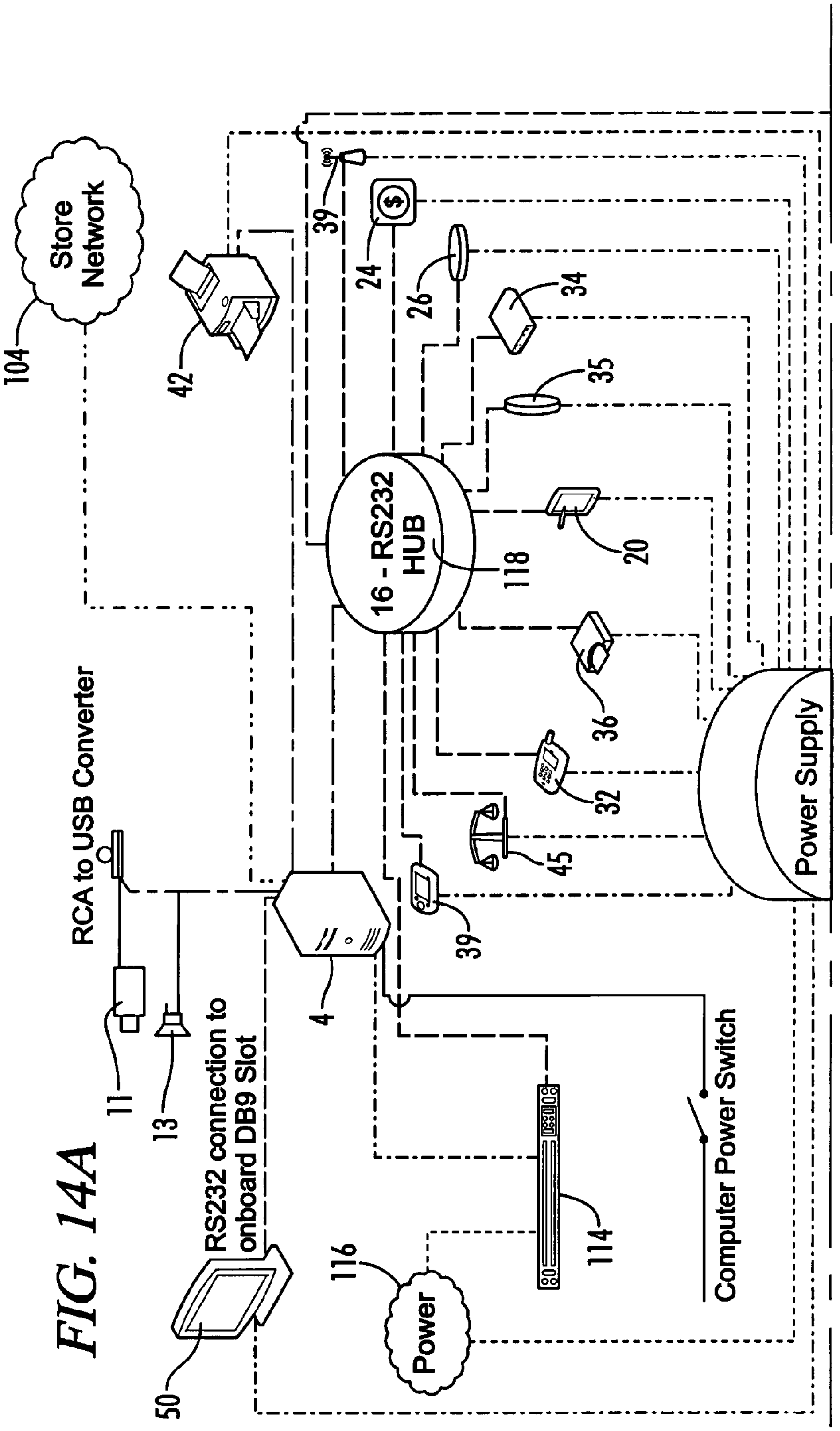
Figure 14B:
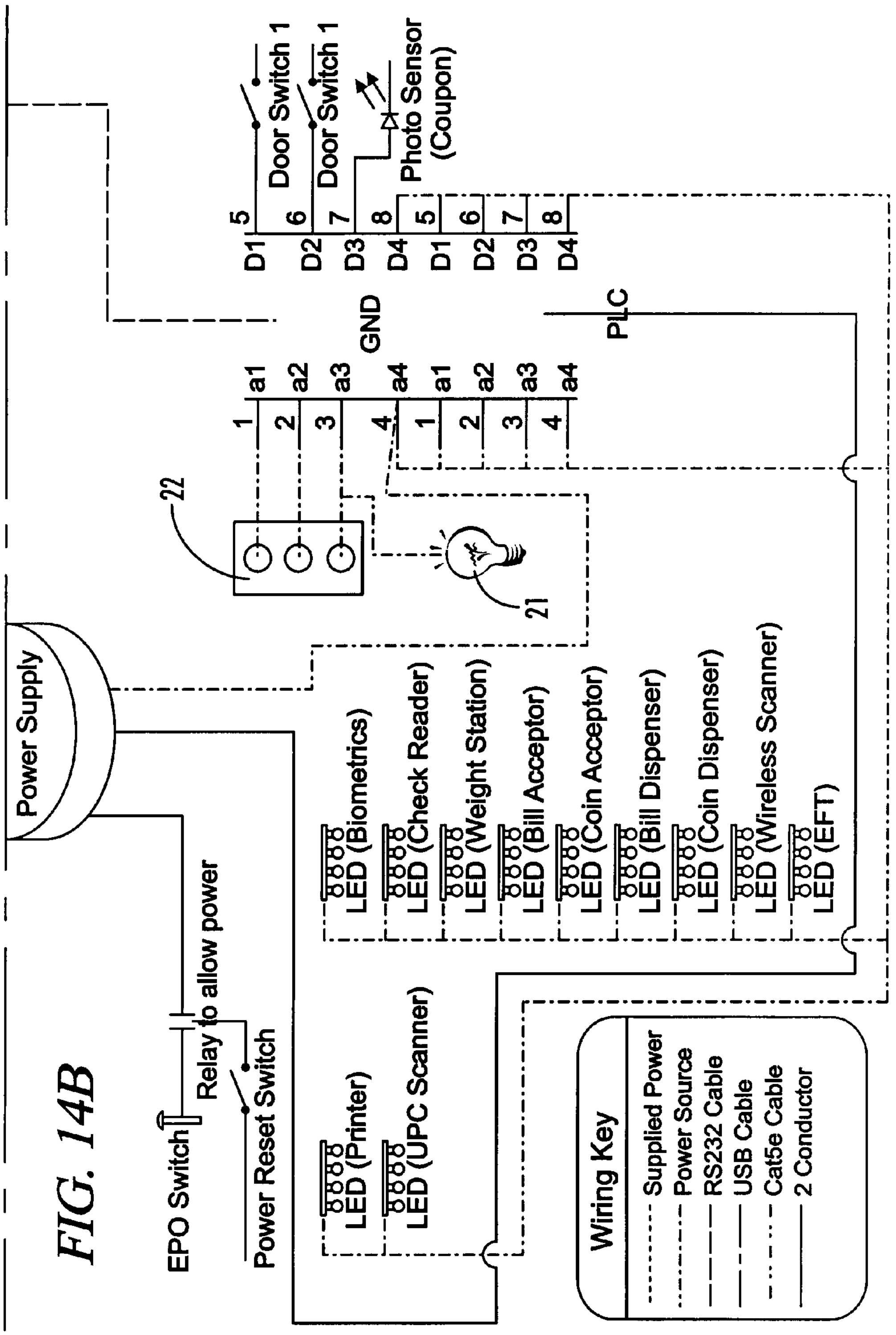

Each type of connection is shown in the "wiring key" of the figure, such as RS232 cable, USB cable Cat5e cable, 2 conductor, supplied power, or a power source connection. Also shown are the types of connections for the components, such as scanner 39, weigh station 45, and the like. As understood by those skilled in the art, each device will be hooked up in its proper port to communicate data and power to each device. For example, shown in FIGS. 14A and 14B are power supply connections to each of the listed devices. Also shown are the data connections for each of the listed devices.

As previously described, the MMS communicates with the self-checkout PC, also called computer 4, and the POS system. In such a set up, the computer 4 is independent of the POS system. Providing such a set up simplifies integration and minimizes the amount of time required for integration. Accordingly, implementing changes and updates are quick and easy. In certain embodiments, MMS controls employee access levels and security access by use of biometrics, using fingerprint technology, for example. Accordingly, employees may have a broad range of permissions, or a very limited set. In certain embodiments, permissions may include allowing the ability to perform quantity purchases, item and transaction voids, cash machine maintenance, visual validation, and price overrides, among other options.

Figure 15:
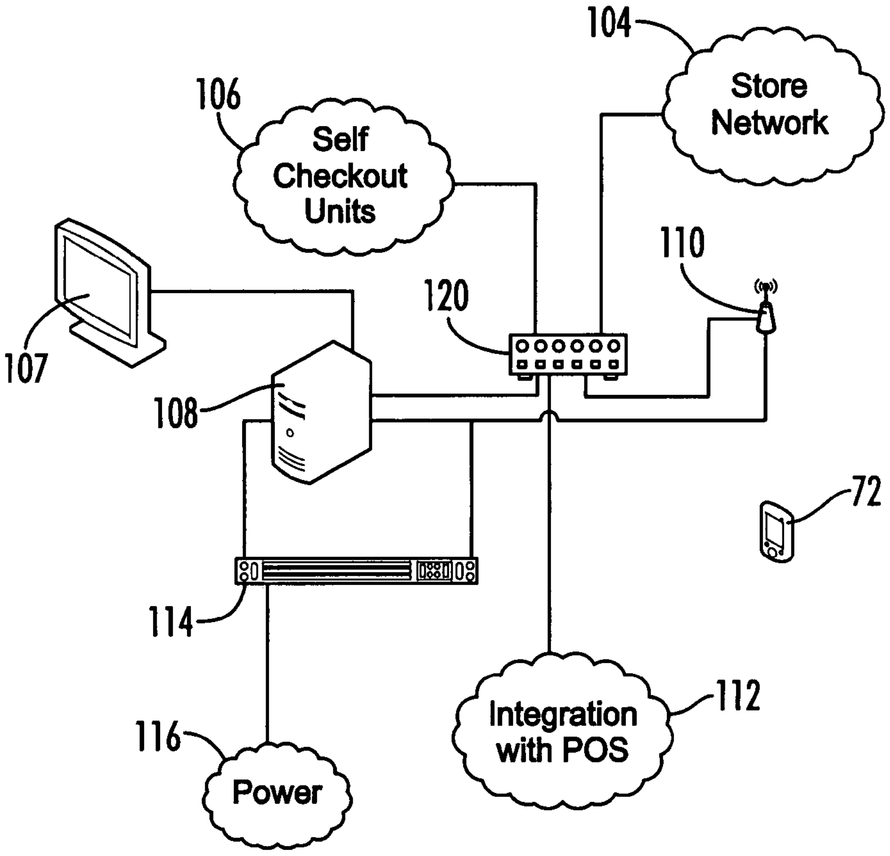
FIG. 15 is a schematic diagram of the connections of the handheld mobile terminal and middleware management system server to the other shown elements of the invention.

Referring now to FIG. 15, in an alternative embodiment, checkout module 10 may include a handheld mobile terminal 72, also called a mobile attendant. Handheld mobile terminal 72 incorporates touch screen capabilities, and is of the type that is widely commercially available. Handheld mobile terminal 72 allows a retail store employee to address remotely any system generated interventions. Examples of such interventions include, but are not limited to, age verification and security violations. A single handheld mobile terminal 72 may be configured to support multiple checkout modules 10. FIG. 15 shows two separate features of the MMS and handheld mobile terminal hardware diagram. First, the figure shows the MMS server 108 allowing the management of the various options of the self checkout units 106. Second, the figure shows how the handheld mobile terminal 72 connects wirelessly directly to the MMS server 108, by use of the wireless capabilities 110. Also shown are the user interface 107 for the MMS server 108, store network 104, router 120, power source 116, and integration with POS 112. In certain embodiments, handheld mobile terminal 72 may download security video for review.

Figure 16:
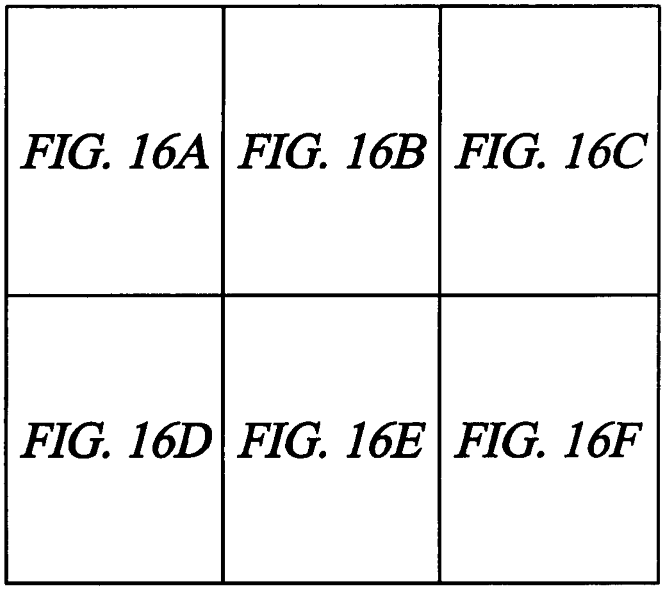
FIGS. 16A, 16B, 16C, 16D, 16E, and 16F make up FIG. 16 which is a flow chart showing a process of use of an embodiment of the present invention by a consumer.
Figure 16A:
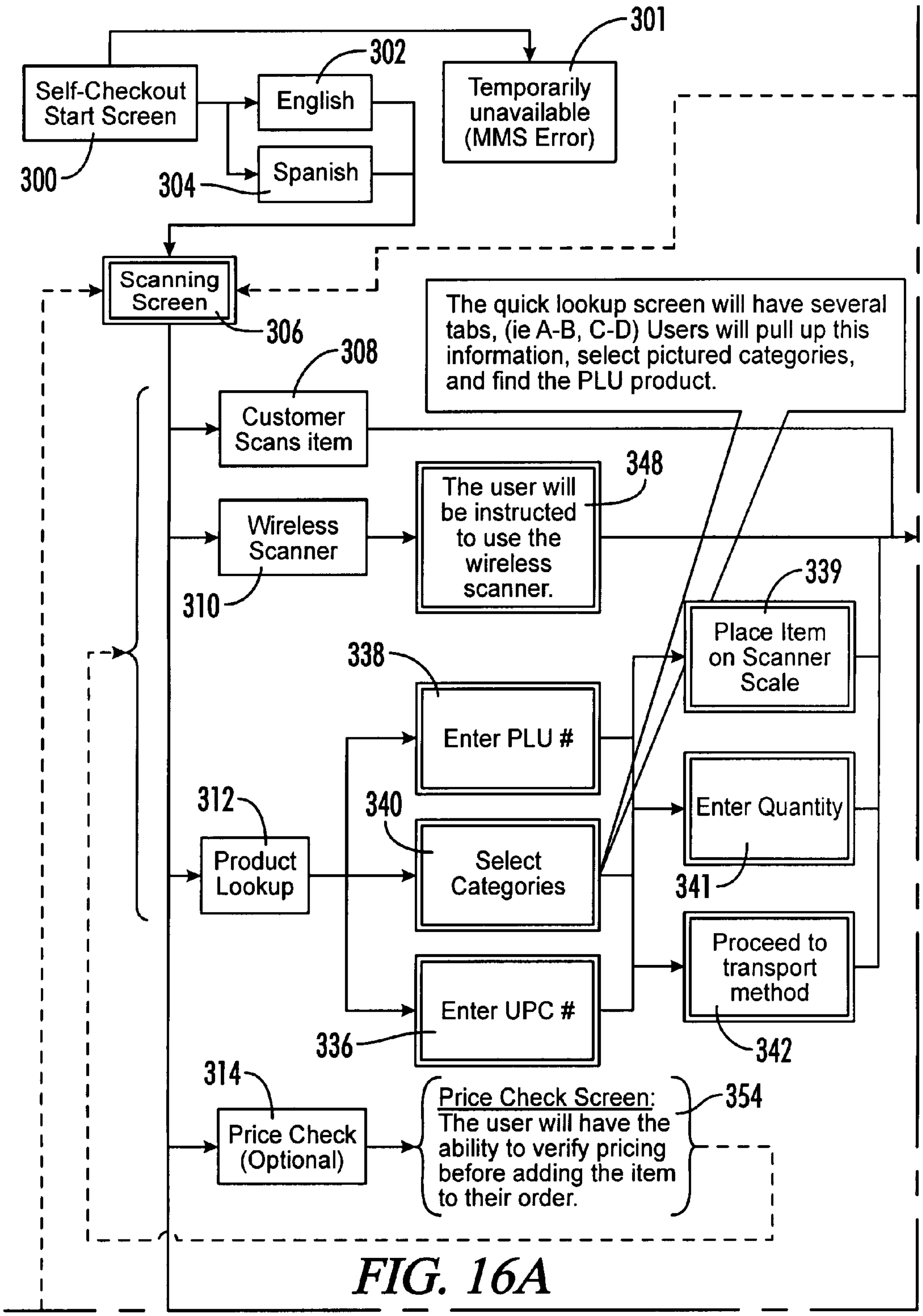
Figure 16B:
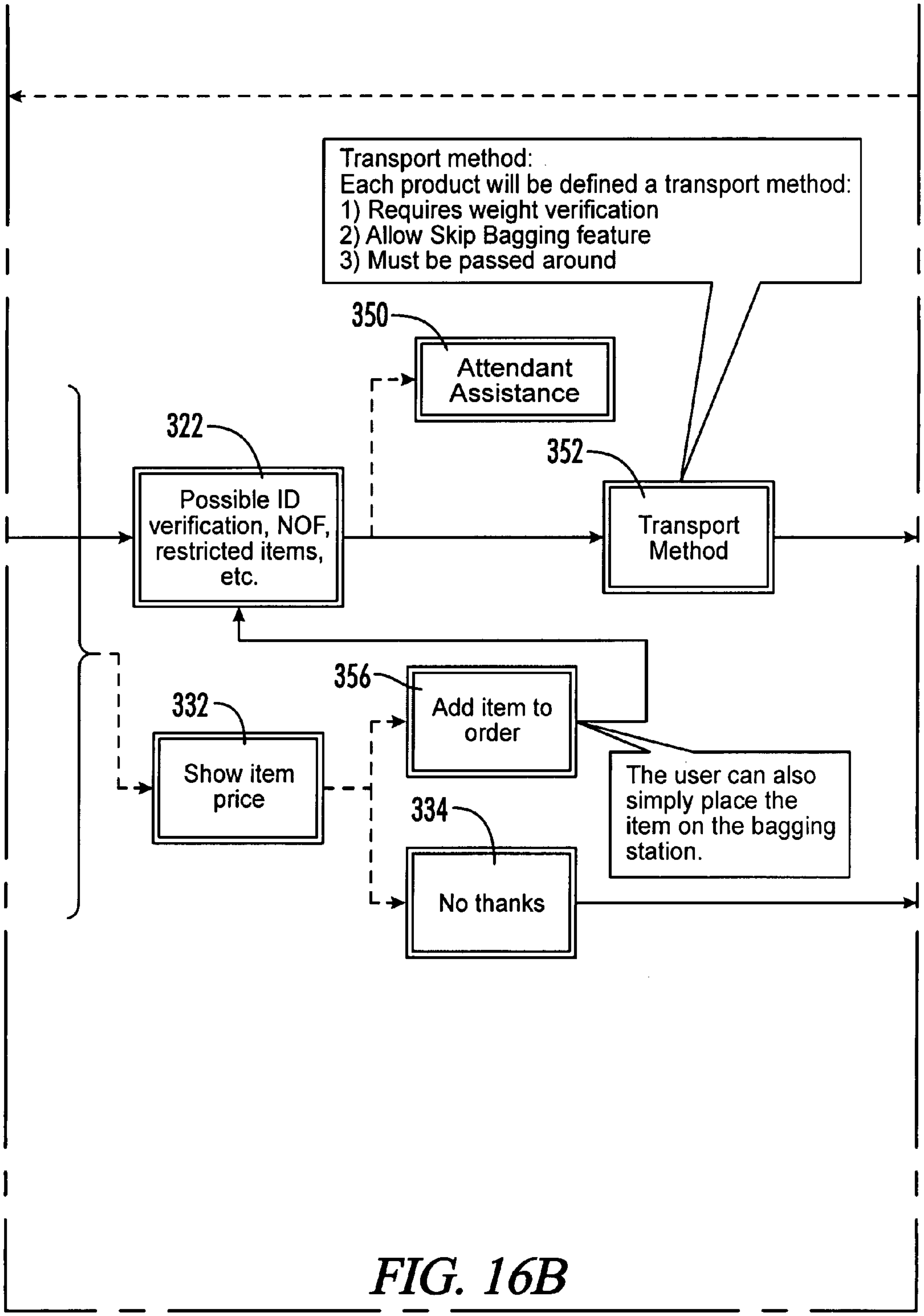
Figure 16C:
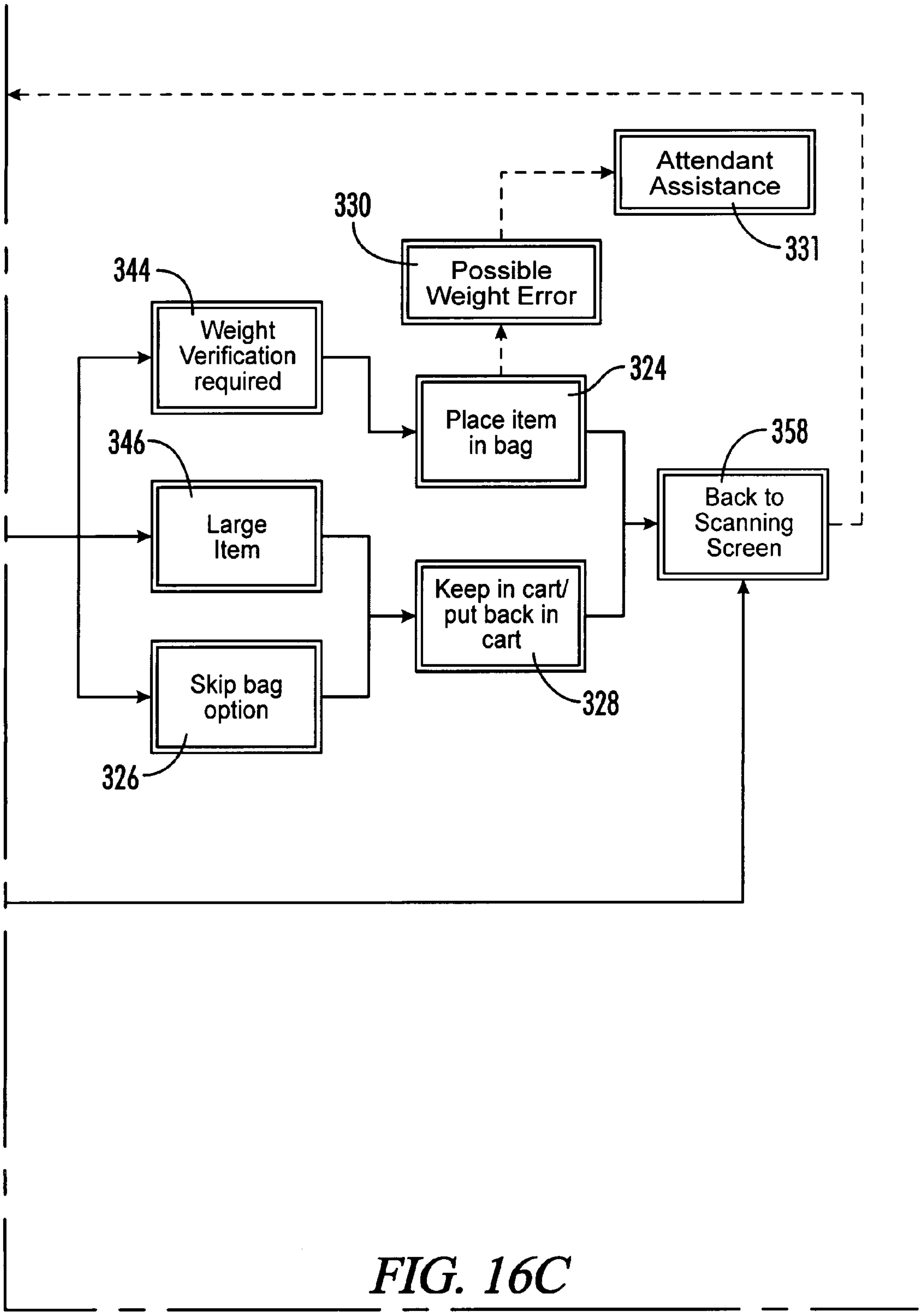
Figure 16D:
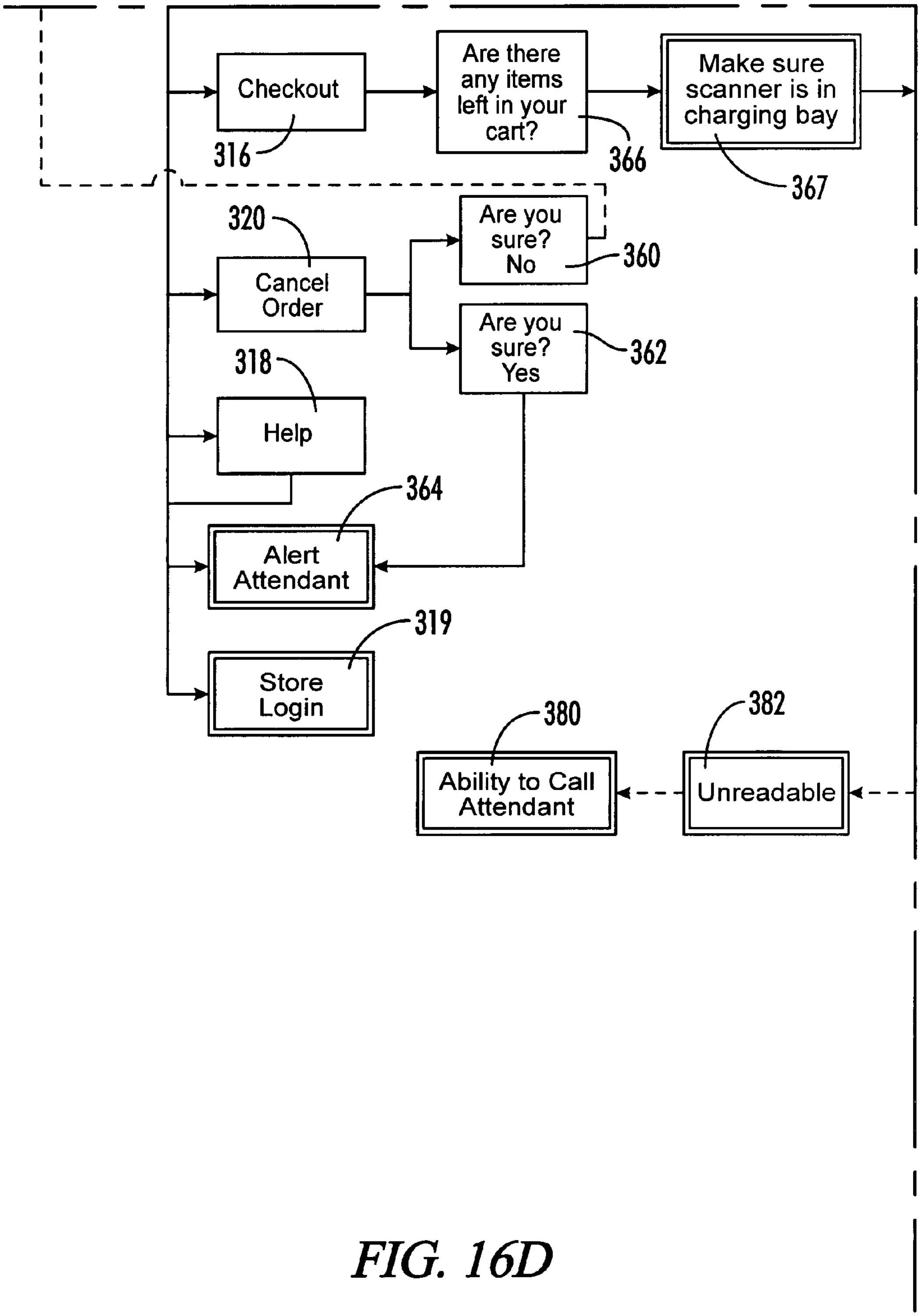
Figure 16E:
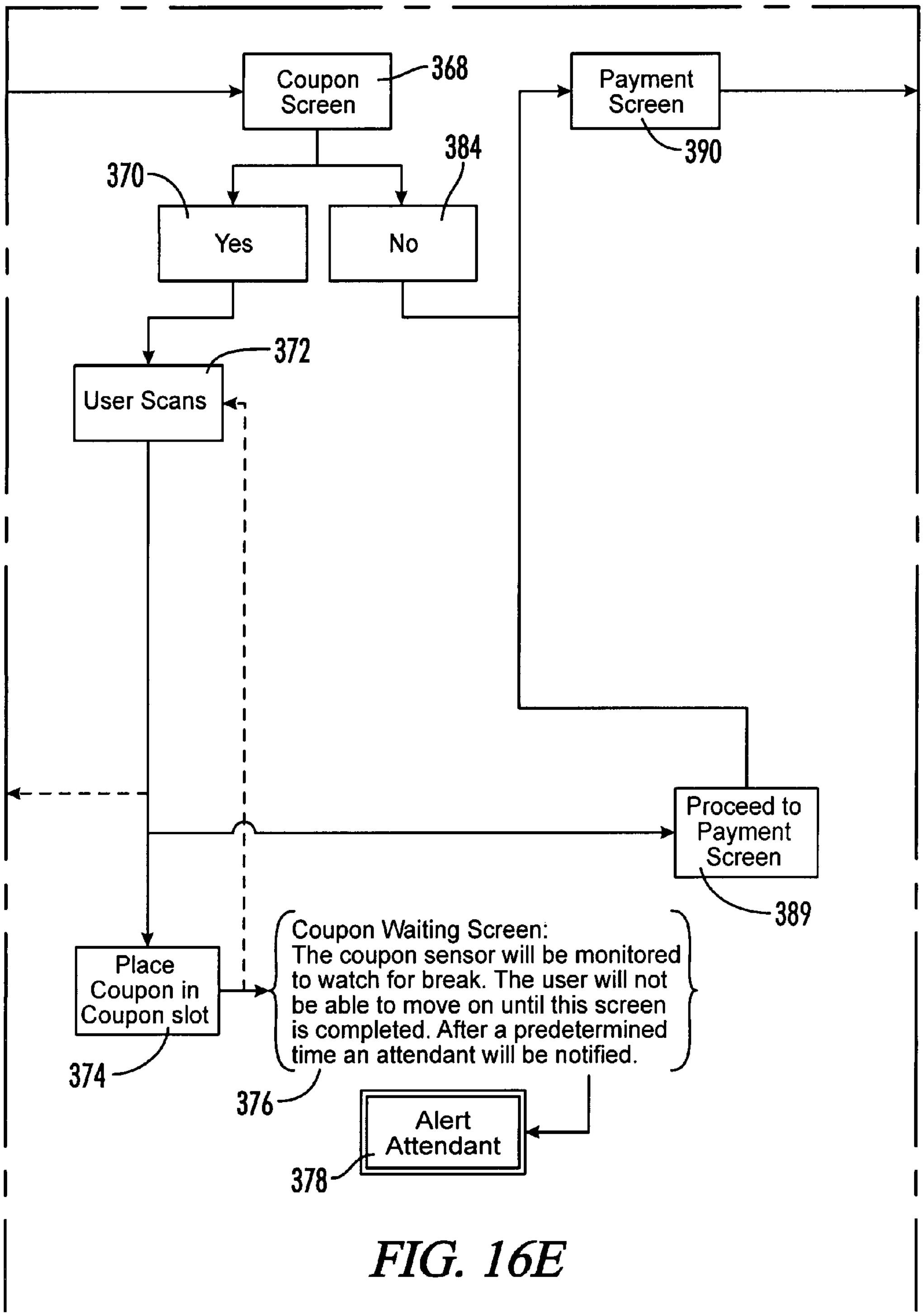
Figure 16F:
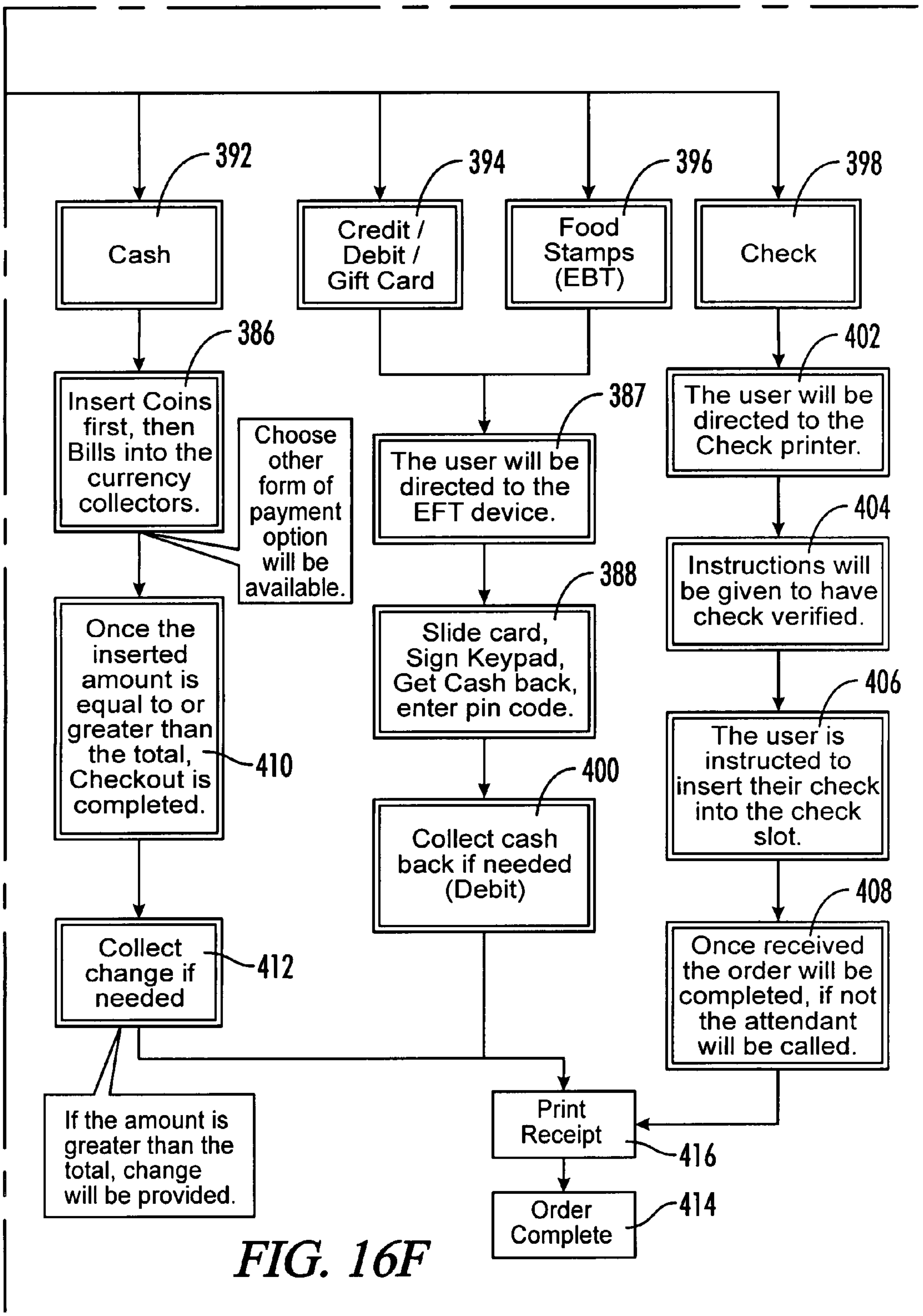

Referring now to FIG. 16, which is made up of FIGS. 16A, 16B, 16C, 16D, 16E, and 16F, there is shown a flow chart of the standard customer interface. The flow chart clearly identifies the steps of the process of using the present invention. In certain embodiments, the computer processing unit 4 is pre-programmed to perform the functions shown or provide the options shown. The following text further describes the flow chart shown in FIG. 16. The checkout module 10 may be referred to as the system. The customer simply touches the screen to start 300 the check out process. The customer will proceed by choosing from English 302, Spanish 304 or other language options. The customer is then directed to the Start Screen 306. Every time an order is initiated the scale will be recalibrated to zero. An error message may be presented 301. The customer can also begin the checkout process by scanning 308 the first product.

Throughout the customer checkout process, visual and audible instructions will help to direct the customer at each step. LED lights at hardware interaction points will alert the customer to areas requiring attention. For example, after a coupon is scanned, the coupon slot will light up for customer attention to enter the coupon into the slot.

In certain embodiments, customer loyalty programs may be used in association with biometric devices, such as finger-print technology. Such a customer loyalty program may obtain and retain payment information, for example credit card information, for the convenience of the customer. In other embodiments, the customer loyalty program may retain birth date information for age verification, and also track sales and trends. All of these options will help speed up the customer transaction and provide a better self-check out experience.

In order to use the module, a user, also known as a customer in the retail store, may take the following steps outlined in this embodiment of using the module. After the customer chooses a language, a list of menu options will display. The typical first step at this point will be for the customer to scan the product across the bar code reader. Other options available to the customer at this time will be Wireless Scanner 310, Product Lookup 312, Price Check 314, Checkout 316, Help 318, and Cancel Order 320.

The system reads the bar code to retrieve the product information, price, restrictions (such as age, time and quantities) and description from the POS system through the middleware management system (MMS) as well as retrieve product weight, transport methods, and weight tolerance levels from the security database located in the MMS. The system first checks for product restriction 322. If no product restrictions are present, the system verifies the transport method for the product. After a successful scan the system instructs the customer to either 1) add the product to the bagging area 324 2) add the product to the bagging area with the option to skip the bag process 326 or 3) leave the product in the cart 328 or return the product back to the cart and skip the bagging process altogether. If the product is added to the bagging area, the product weight is then added to the total weight variable and will not allow the customer to scan additional products until the bagging area weight matches the weight variable. If for some reason the weight is inconsistent, a predetermined discrepancy percentage will be applied. If the weight difference exceeds the specified discrepancy tolerance, it visually and audibly instructs the customer to correct the problem. After a predetermined amount of time, the system visually and audibly alerts the store attendant for assistance 331. For weight tolerance settings, variables will be assigned to each product along with global settings. These settings are maintained in the MMS security database and can be updated at anytime in the store.

An additional advantage of the current system is the remote update. In currently existing technology, if a change, for example a security database change, needs to be made in 1000 different stores, then it is necessary to make that change 1000 times. Using a remote update of the presently disclosed system, which utilizes VPN technology, as soon as one store updates the database, the change will also be made in the other 999 stores in a matter of seconds.

When weight discrepancies 330 are detected the store attendant can view the lane number, the weight difference and product scanned. The attendant at this time will choose to ignore the error, add product weight to the security database (this will require the store attendant to place the product on the scanner scale) or remove product from the order. Once corrected, the customer order process resumes. The weight security feature can be turned on and off. If this feature is turned off the system still monitors for a weight change, but not verify that change with the security database.

The customer checkout screen displays product description information and price 332 of each product scanned and compute a running total of all products. The customer has the option to remove 334 product(s) from the order or cancel the entire order. Customer order cancellations require attendant approval. The option to delete or modify quantities if a product is scanned incorrectly will also be given to the store attendant. Access to call for an attendant is visual at all times during the customer process.

Keypad or numeric entry is available for manual entry of UPC codes 336 that are illegible or unable to scan and/or entry of PLU numbers 338 assigned to such products as produce. When entering, the item is placed on the scanner 339 and the quantity is entered 341.

The customer has the ability to select "Product Lookup" for non barcoded products. Products can be located by categorized tabs 340 that may be setup by the store on the MMS for fast product location. The store will use categories such as A-B, C-D, and Common Products to allow customers to find the product they are looking for quickly and easily. The types of products without barcodes or requiring look up will be determined during the initiation stage of the project integration. A grouping of frequently selected products will be easily accessible under a "common products" list. There are different types of products requiring look up: 1) products with PLU numbers, 2) products without barcode (missing or not supplied) 3) invalid, illegible or unassigned barcodes. When the customer selects "Product Lookup" they will have 2 options; 1) search by PLU number, 2) Select Categories.

The security database in the MMS will assign product transport method 342 by product. Mandatory weight verification 344 on products directs customer to add the product to the bagging area. (By default mandatory weight verification will be assigned to all products initially). Product identified by the retailer in the database as "large or oversized" 346 can be passed around the weight scale/bagging area and put directly into the cart for transport from the store. The receipt will mark this product as "pass-around" for reference at the time of return. Retailer identified products can also generate the "skip bagging" option. Products assigned this option display "skip bagging" button during the bagging instruction screen. The customer manually selects this option to bypass bagging and places the product directly in the cart or leaves it in the cart from onset of the transaction. In certain embodiments, a wireless handheld scanner may be associated with each checkout module. Customers use the wireless scanner 348 to scan the barcode on the product without attendant assistance or removal from cart.

In certain embodiments, the present invention may function with a wireless terminal, called a mobile attendant 72. Such wireless terminals are well known and widely commercially available. This device will perform all the same procedures as the attendant assistance application, but will allow mediation to be done without removing the customer from the checkout module 10. This mobile device will allow attendants to perform other tasks while self checkout is taking place and help remotely when needed. Depending on the mediation, the attendant will still have to interact with the customer.

The mobile attendant 72 will be able to perform some tasks that the attendant assistance 350 application cannot. The mobile attendant will have the ability to pull up live video footage if needed for security purposes.

Although the mobile attendant 72 can perform the same task as the attendant assistance application, it is an entirely separate program that will be modified to work with the smaller store environment. A retail store may determine the number of wireless handheld scanners, also called mobile attendants 72, needed. The mobile attendants 72 communicate only with the MMS. In certain embodiments, a mobile attendant 72 can monitor many, or only one checkout module 10. Further, several mobile attendants 72 can monitor the same lanes to provide overlap for training purposes, or enhanced customer service. The mobile attendant 72 is able to handle all alerts or mediations that occur. Further, the mobile attendant 72 is able to scan items which may be added to a customer's transaction anywhere in the store as long as wireless access is available.

By use of VPN technology in the currently disclosed system, the system will integrate stores and the corporate network with a support infrastructure. In doing so, updates may be made to all hardware and software remotely. Furthermore, this allows for constant monitoring of the equipment. In certain embodiments, power may be cycled on each piece of hardware to allow for effective remote support.

Referring back to FIG. 16, the customer has an option located on the scanning screen denoted "wireless" 310. This button will direct the customer to use the wireless scanner 348. If at anytime the customer removes the wireless scanner from the charging bay, it will automatically direct the customer to the wireless scanner screen, by-passing the requirement of the initial button press. Next, the transport method is then identified by the system 352. Each product's standard transport method flagged in the database will also apply when scanned by the wireless scanner 39. If the customer scans a product that must be placed into the bagging area, the system will instruct the customer to do so. If the system detects that the customer has hit the checkout screen without placing the wireless scanner back into the charger dock, it will not allow the customer to proceed until the scanner has been replaced. After a specific amount of time the store attendant will be notified.

In certain embodiments, products not-on-file, products requiring age verification or visual verification and quantity/time restricted products require attendant mediation and will delay the order process.

In other embodiments, a price checking option is located on the scanning screen allowing customers to verify a price without necessarily purchasing the product. This option can be turned on and off in the MMS. After the customer selects the option for a price check, they will have the ability to simply scan the product, perform a product lookup 312 or use the wireless scanner 310. The customer will follow the normal procedures until the price can be determined. The price will display on the screen giving the customer two options: 1) Add product to order 356 or 2) "No Thank You" 334. If the customer chooses "No Thank You" it will direct them to set the product aside and the system returns to the scanning screen 358. If the customer chooses yes (add product to order) the system identifies the product transport method 352 and the product price/description is added to the order. The customer can also place the product in the bagging area without choosing "Add Product to Order" and the system will automatically detect weight differential and add the product to the order. The price check feature provides added convenience to the customer, but implementation is an option to the retailer.

In certain embodiments, the customer has the ability to cancel the entire order 320. If the customer chooses to do so, a screen displays asking the customer to confirm the request to cancel order. If the customer selects "no" 360, the system will return to the scanning screen 306. If the customer selects "yes" 362, the store attendant will be alerted. The attendant 364 must approve the cancellation, login 319 to assist, and collect the merchandise from the customer. This feature may be turned on or off in the MMS.

The customer has the option to complete the entire self-checkout experience without ever touching the screen. A customer can scan products, bag them and process payment through the system which navigates to the required screens without customer selection. In other embodiments, a checkout button displays throughout the entire scanning process for a customer to select once all products from the shopping cart are scanned. This button will link to the checkout screen.

Checkout Screen

At this point all products should either be located on the scanning scale or left in the cart 366. The scanner is placed in charging bay 367. The system will first ask the customer if they have any coupons 368. If so 370, it will allow the customer to scan 372 the coupon and slide it into a coupon collection slot 374. The discount amount of the coupon is shown as a line item and deducted from the total order amount. A sensor added to the collection slot can monitor coupon pass through 376, halting the checkout process until a coupon is identified. If it does not detect the coupon after a predetermined time, it will notify the store attendant 378. This feature can be turned on and off. The customer will also have the option to scan coupons during the regular scanning process, but only after the product to which the coupon applies has been scanned. This screen serves as more of a reminder to the customer. While the customer is scanning coupons, the option to call an attendant for assistance 380 with illegible coupons 382 or other errors will always be available. The customer can bypass the coupon scan option by selecting "no coupons" 384 or by inserting payment 386, scanning debit/credit/EBT 388 directly and proceed 389 to the payment screen 390.

Payment Screen

In certain embodiments, after the coupon screen, the customer selects a payment method. Any form of payment methods can be accepted (i.e. cash 392, credit cards 394, EBT, checks 398, and food stamps (EBT) 396). By way of example, credit card, debt card, gift card, EBT food stamps may be processed through the credit card terminal 387 that is provided by the Retailer. This information will be sent to the POS system through the MMS. Approved transactions will be determined at the POS level. If the customer chooses the Cash Back option when using a debit card, visual and audible alerts will direct the customer to the bill dispenser to collect the money.

In certain embodiments, if the customer uses a gift card and a balance remains to be paid against the total purchase, multiple tenders are required. The customer will be transferred back to the Payment screen to choose another form of payment to pay the remaining balance 400. If the customer decided not to complete the order at this time, the order will be suspended requiring attendant assistance and completion at a customer service terminal.

If the customer uses an EBT Food Stamp payment option, the POS will have to identify the products for which to deduct payment and specify which products are restricted for EBT payment requiring another form of tender. Depending on the POS, this process may vary and will be determined during the integration phase. Preferably the products will have a flag in the database to determine if it is payable by a Food Stamp. When products that cannot be purchased with Food Stamps are processed in the order, the customer will be required to use multiple tenders to pay the remaining balance for such products. If the customer decides not to complete the order at this time, the order will have to be suspended and completed at a customer service terminal.

In certain embodiments, checks may be inserted into a check verification printer 402 located on the checkout module that will verify the check. The customer will be instructed 404 to simply sign the check and insert it into the printer 406. The print will automatically print the total amount due on the check and make a digital copy of the check. The user will be able to take the check with them 408. If required, the customer will be instructed to place their identification into an identification scanner located on the printer 42. This will make a digital copy of the identification that will be kept with the check. The information will be transferred to the MMS and sent to the POS system.

In certain embodiments, cash tenders will accept both bills and coins. While the system will allow the customer to insert currency in any order, a message will direct the customer to deposit coins then bills. This will insure change is correctly processed. A total screen will display the amount of currency the customer has inserted. Once the customer inserts a cash amount equal to or greater than the total amount of the order 410, the system will automatically print the receipt 416, complete the order 414 and provide change 412. With a cash transaction the customer will have the option for multiple tenders. An option to choose another form of payment will be available at all times during the cash payment process. The customer can then choose any other form of payment for the balance of the order.

In certain embodiments, transfer of current information back and forth between the computer processing unit 4, MMS, and point of sale (POS) system occurs as a real time data transfer. This allows credit card, or gift card, verification and capture. For example, consumer may swipe a credit card so that the computer processing unit 4 communicates that information to the MMS. After the POS system accepts or declines the transaction, the computer processing unit 4 get the transaction details from the MMS. All UPC, coupon, product description, pricing, and the like, is streamed from the POS system when the consumer scans each product.

III. Using Checkout Module in Employee Assisted Mode

Figure 17:
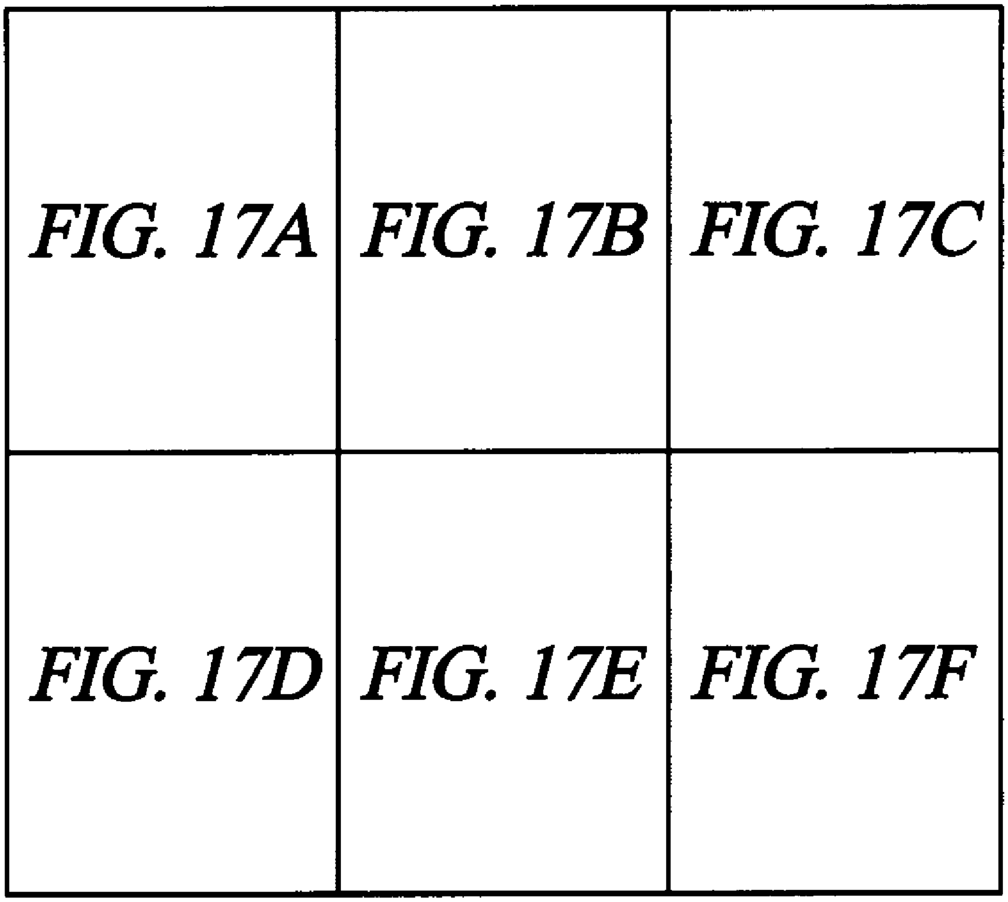
FIGS. 17A, 17B, 17C, 17D, 17E, and 17F make up FIG. 17 which is a flow chart showing a process of use of an embodiment of the present invention when the checkout module is being attended by a retail store employee.
Figure 17A:
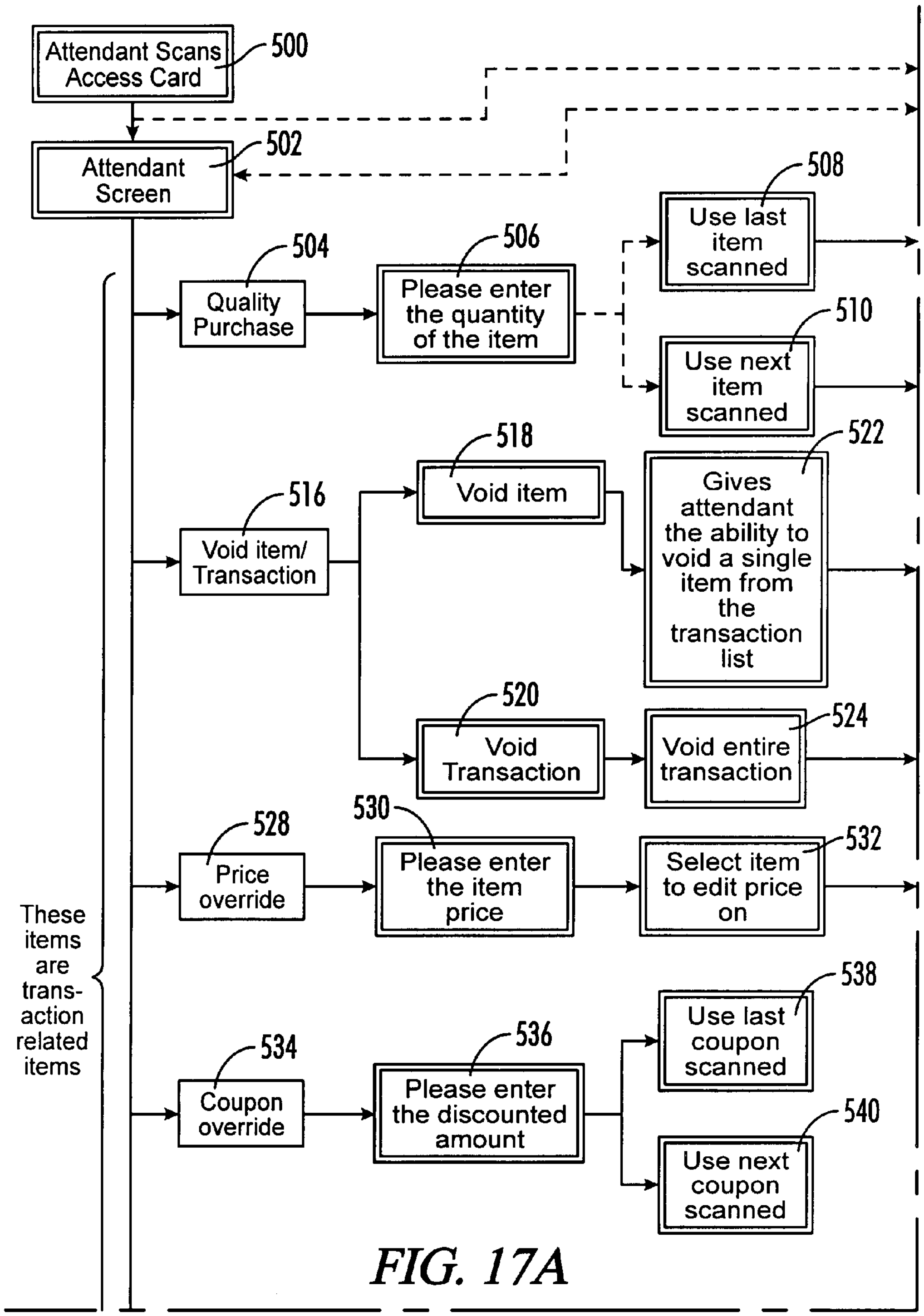
Figure 17B:
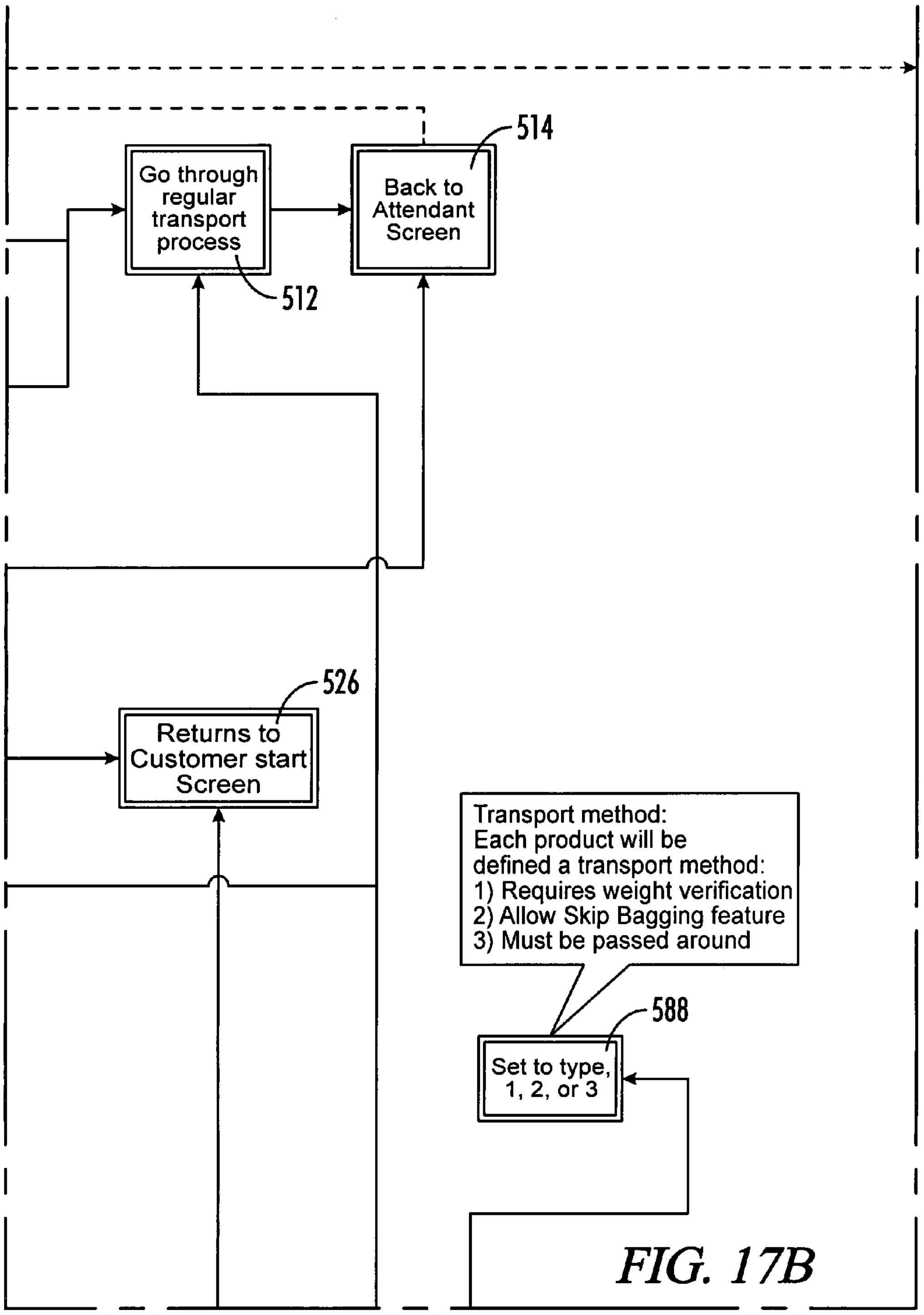
Figure 17C:
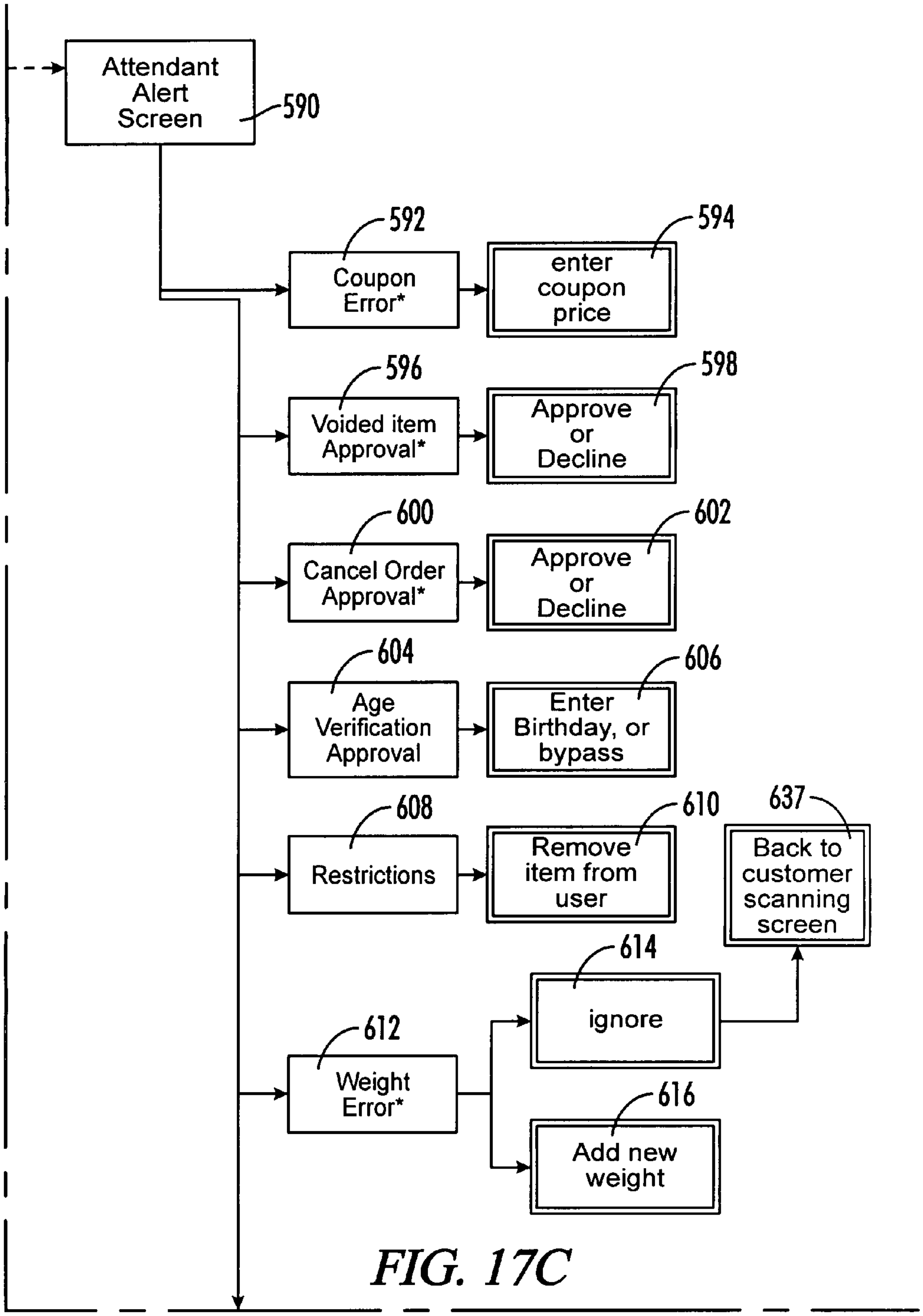
Figure 17D:
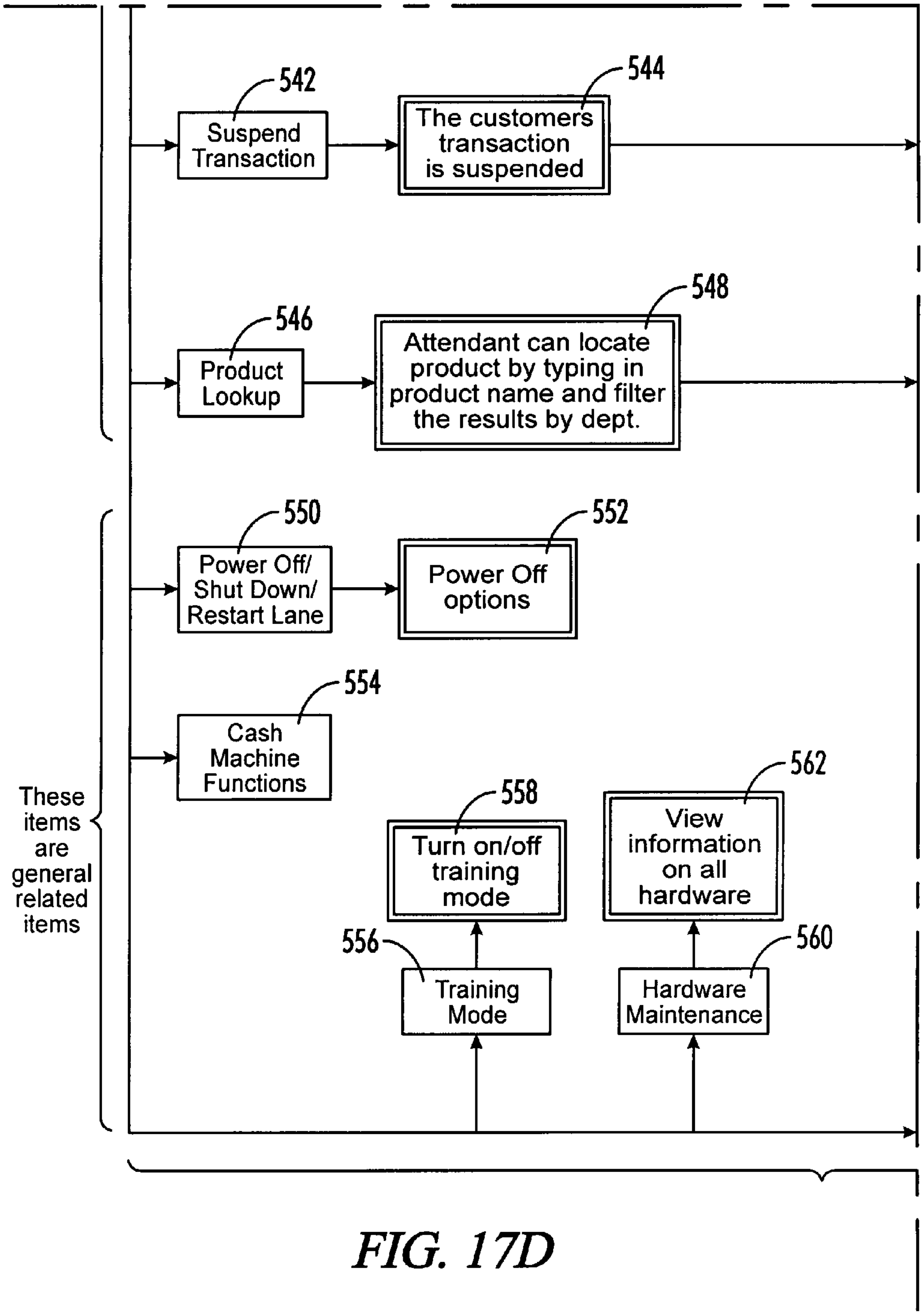
Figure 17E:
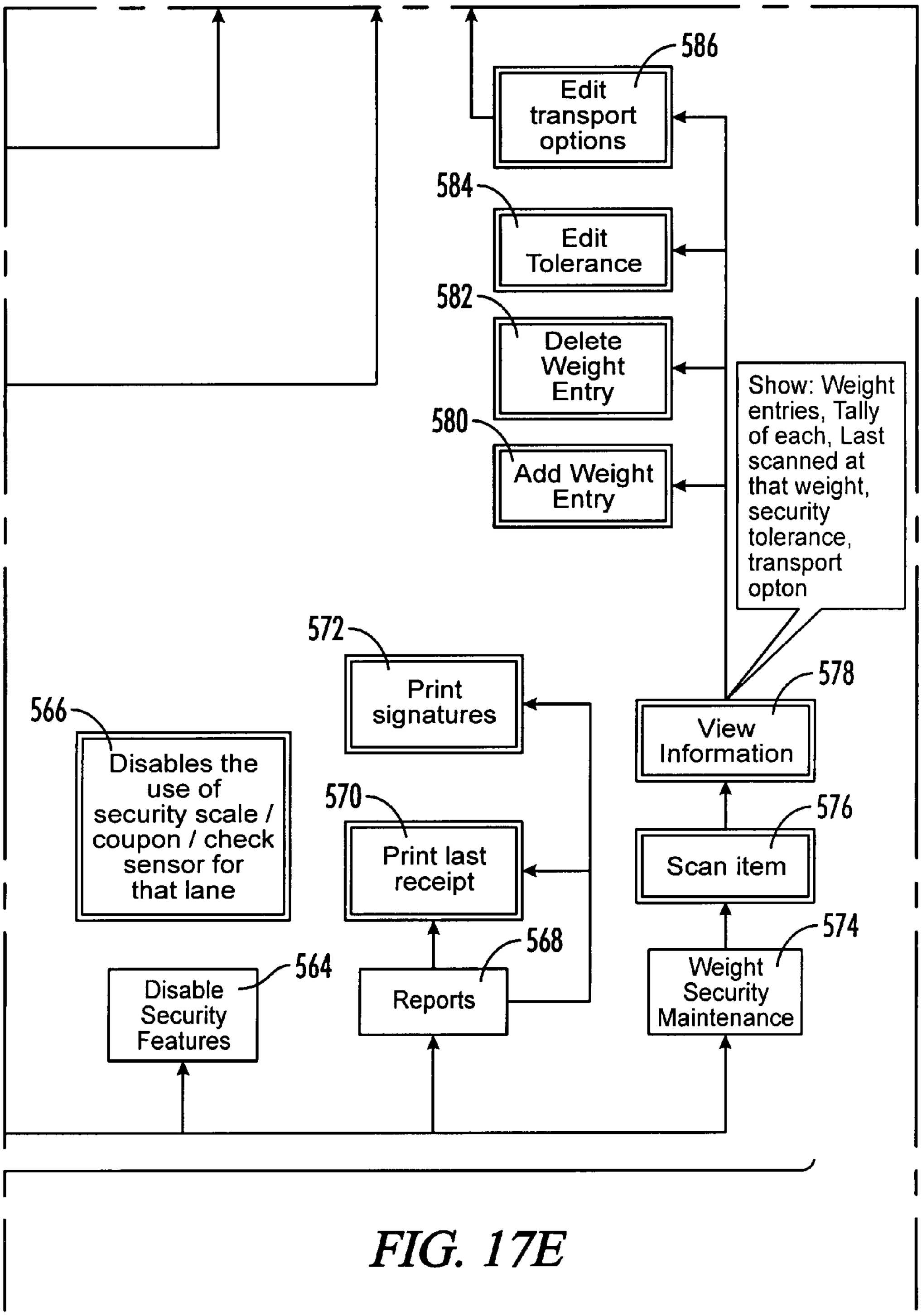
Figure 17F:
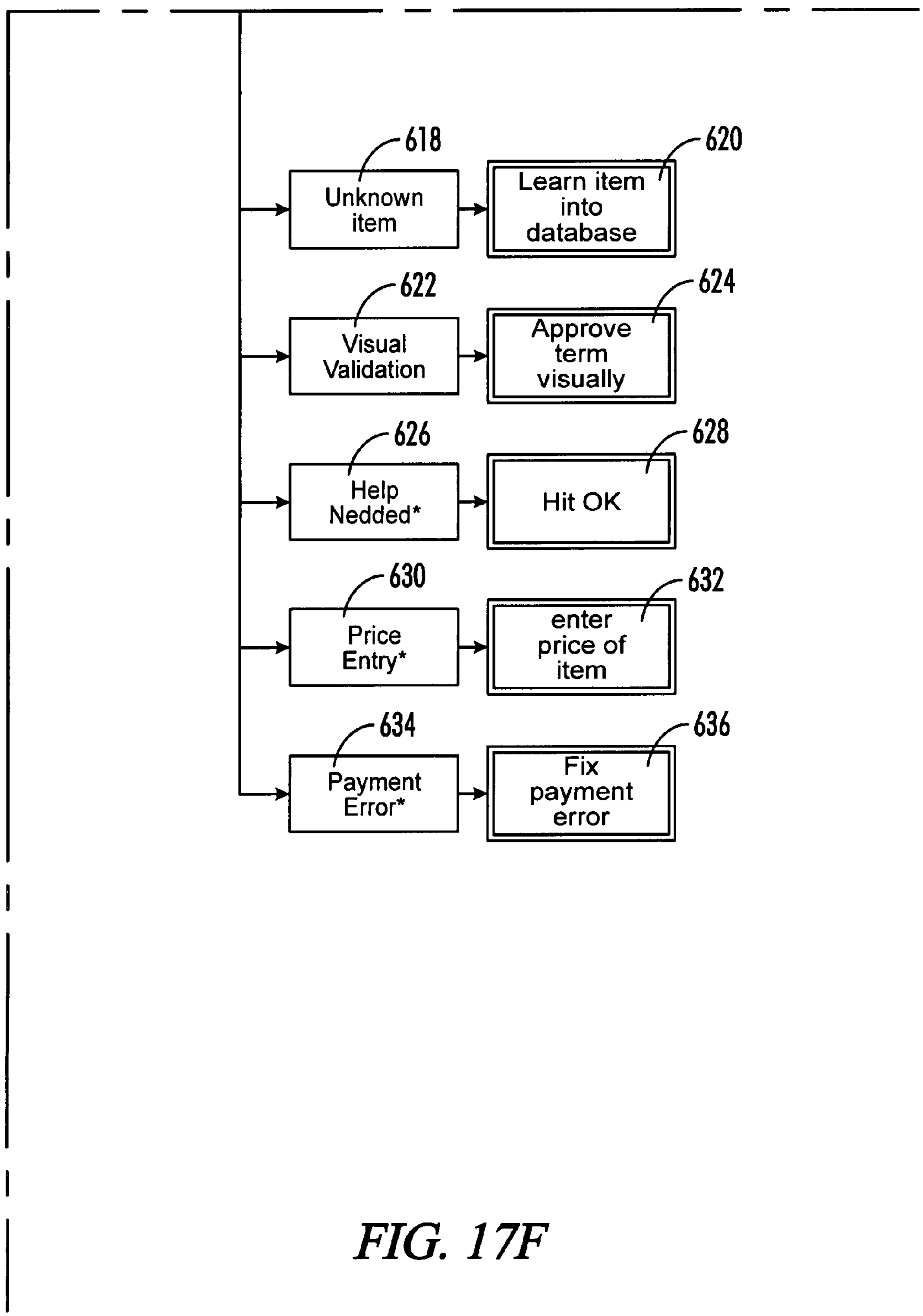

To provide for faster checkouts during busy periods, checkout module 10 can be used in an employee assisted mode. Shown in FIG. 17, which is made up of FIGS. 17A, 17B, 17C, 17D, 17E, and 17F, is a flow chart identifying the types of activities which may be completed by employees. The method for operating in this mode begins with having the employee signal his presence 500 by logging in by any of the following methods: using display 50 to input his employee ID and password, swiping a magnetic ID badge, by scanning a barcode on his employee ID, by passing an employee ID having an RFID emitter by the RFID reader, or by logging in with the biometric identification reader. Once the employee has signaled his presence, the employee can instruct 502 checkout module 10 the level of assistance that he will provide.

The attendant may enter the quantity of a purchase 504, void an item or transaction 516, perform a price override 528, coupon override 534, suspend the transaction 542, shut down and restart lane 550, perform cash machine functions 554, perform training 556, hardware maintenance 560, disable security features 564, prepare reports 568, or perform weight security maintenance 574. The quantity purchase 504 requires the entry of the quantity of the item 506 by using the last item scanned 508 or the next item scanned 510, followed by the regular transport process 512 and going back to the attendant screen 514. Voiding an item or transaction 516 requires electing whether to void an item 518 or transaction 520, then the single item is voided 522, or the entire transaction 524, in which case there is a return to the customer start screen 526. A price override 528 calls for the entry of the item price 530, then selecting the item to edit the price of 532. This is similar to a coupon override 534, in that a coupon override calls for the entry of the discounted amount 536 and the selection of the last coupon scanned 538 or the next coupon scanned 540. When a customer's transaction is suspended 544, the customer start screen 526 is returned to. For a product lookup 546, the attendant can locate the product by typing in the product name and filter the results 548. A power shut down 550 presents the power off options 552. Training mode 556 may be turned on or off 558. Hardware maintenance 560 allows the attendant to view information on all hardware 562. Disabling security features 564 disables the use of the security scale, and coupon/check sensor for that lane 566. Preparing reports 568 allows the printing of signatures 572, or printing of the last receipt 570. Weight security maintenance 574 allows the attendant to scan an item 576, view information 578, then add a weight entry 580, delete a weight entry 582, edit tolerance 584, edit transport options 586, or set type of transport 588.

The attendant may respond to an attendant alert screen 590. If there is a coupon error 592, they may enter the coupon price 594. If voided item approval 596 is needed, they may approve or decline 598. If a cancel order approval 600 is needed, they may approve or decline 602. If age verification 604 is needed, they may enter a birthday 606 or by pass. If there is a restriction 608, they may remove the item from user 610. If there is a weight error 612, they may ignore 614 it and go back to the customer scanning screen 637. Alternatively, they may add a new weight 616. If there is an unknown item 618, they may learn item into database 620. They may provide a visual validation 622, and approve the validation 624, receive a request for help 626 and acknowledge 628 the request. If there is a price entry matter 630, they may enter the price of the item 632. If there is a payment error 634, they may fix it 636.

Typically, the assistance will be primarily with bagging, and in this mode checkout module 10 will disable the security features such as weight verification since the employee will be able to monitor the items being purchased on display 60. Alternatively, if the retailer wants more security, checkout module 10 can be programmed to retain the security features as used for self checkout or to increase the tolerance to reduce the number of false alerts.

If using an embodiment of the invention including a cash drawer 70 under the display 50, the employee can additionally configure checkout module 10 to direct the customer to tender cash or check payments to the employee. The employee could then provide change for the customer from cash drawer 70. This increases the number of customers that can be processed through the checkout lane 100 in a given period by avoiding the delay that occurs when a customer has to feed each individual bill and coin into the currency acceptors.

Alternatively, checkout module 10 could be configured to refuse cash or check payments during busy periods and to print a due bill that the customer could take to a remotely located, attended cashier station to complete the transaction.

IV. Use of E-Pay Only Version of Checkout Module 10

As discussed above, checkout module 10 may be configured to accept only electronic payments via EFT terminal 20, RFID reader 30, or biometric identification reader 32. In such a configuration, the retailer may choose to restrict lanes utilizing checkout module 10 to such non-cash and non-check payments in the same manner that many retailers restrict certain lanes to a maximum number of items.

But to avoid such restrictions on who can use a checkout lane 100, checkout module 10 can be configured to print a due bill when the customer indicates a desire to pay by cash or check via the touch screen capability of display 50. Checkout module 10 would then print a due bill showing the amount due and the customer would be directed to a remotely located cashier stand. At the cashier stand, the customer would tender payment in cash or by check along with the due bill.

Also, when checkout module 10 is configured to accept only electronic payments when in self checkout mode, it can be configured to allow cash or check payments to be tendered to the employee working in the bagging area when checkout module 10 is operated in an employee assisted mode. This would of course require that a cash drawer 70 be installed either under the display 50 or below the scanner scale in the lane.

This patent application incorporates by reference the details in all patents, published patent applications, references and publications disclosed herein.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A checkout module for use in a checkout lane in a retail store, wherein said checkout lane has a queuing area for customers waiting to checkout, a scanner that a customer uses to scan items being purchased, and a bagging area, comprising:

a cabinet, the cabinet having a first side, a second side, and a third side;

a video display mounted on the first side of the cabinet;

a plurality of casters located on the bottom of the cabinet;

a hinge attached to the cabinet;

a latch attached to the side of the cabinet opposite of the side to which the hinge is attached;

a payment accepting device attached to the cabinet;

a currency dispensing device attached to the cabinet.

2. The checkout module of claim 1 wherein the video display includes a touch screen the customer can use to interact with the checkout module.

3. The checkout module of claim 2 further comprising:

a slide bracket attached to the hinge;

a slide track attached to the slide bracket;

a checkout lane attached to the slide track.

4. The checkout module of claim 3 wherein the payment accepting device is selected from the group consisting of an EFT terminal, a biometric identification reader, a paper currency acceptor, and a coin currency acceptor.

5. The checkout module of claim 3 further comprising a data connection cable, the connection cable having a first end connected to the checkout module and a second end terminating in a connector.

6. The checkout module of claim 5 wherein the checkout lane includes a means for verifying each item that has been scanned.

7. The checkout module of claim 5, wherein the data connection cable further comprises:

a cable to carry the output from the scanner;

a cable to carry the output from a scale that is incorporated in the scanner; and a network cable to connect the checkout module to the retail store's inventory management software.

8. The checkout module of claim 5, further comprising a latch point attached to the checkout lane.

9. The checkout module of claim 8 wherein said cabinet is sized to fit into the space provided for a cashier in a conventional checkout lane.

10. A method of converting a conventional checkout lane that includes a scanner and a bagging area to a checkout lane that can be operated in a self-checkout mode or an employee assisted mode comprising:

installing a receptacle on the checkout lane, the receptacle comprising an output from the scanner;

installing one or more latch points on the checkout lane;

operably connecting a checkout module including self-checkout and employee assisted checkout capabilities to said receptacle;

removably connecting the checkout module to the checkout lane by latching the checkout module to the latch points, so that the checkout module rotates relative to the checkout lane.

11. A method of converting a checkout lane from a conventional attended configuration to a self checkout configuration, comprising moving a checkout module from a first position to a second position, wherein the checkout module is both rotated and moved along a linear path.

12. The method of claim 11, wherein the rotation of the checkout module is about 90 degrees.

13. A checkout module for use in a checkout lane in a retail store, wherein said checkout lane has a queuing area for customers waiting to checkout, a scanner that a customer uses to scan items being purchased, and a bagging area, comprising:

a cabinet, the cabinet having a first side oriented toward the customer's location when the customer is scanning items to be purchased, a second side oriented toward the queuing area, and a third side oriented toward the bagging area, when the cabinet is in a first position;

a plurality of casters located on the bottom of the cabinet;

a hinge attached to the cabinet so that the cabinet may be rotatably and slidably attached to the checkout lane;

a video display mounted on the first side of the cabinet, the video display having a touch screen the customer can use to interact with the checkout module;

a payment accepting device attached to the cabinet;

a currency dispensing device attached to the cabinet;

a handheld mobile terminal operably connected to the scanner;

a remote security database, the database being accessed through VPN technology by the handheld mobile terminal.

14. The checkout module of claim 13 wherein the payment accepting device is selected from the group consisting of an EFT terminal, a biometric identification reader, a paper currency acceptor, and a coin currency acceptor.

15. The checkout module of claim 13 further comprising a data connection cable, the connection cable having a first end connected to the checkout module and a second end terminating in a connector.

* * * * *